United States Patent
Takayama et al.

(10) Patent No.: US 8,089,716 B2
(45) Date of Patent: Jan. 3, 2012

(54) MAGNETIC TAPE, MAGNETIC TAPE APPARATUS, SERVO PATTERN RECORDING APPARATUS, MAGNETIC TAPE PRODUCING METHOD, AND MAGNETIC TAPE RECORDING METHOD

(75) Inventors: Jun Takayama, Tokyo (JP); Seiji Kumagai, Miyagi (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 12/337,103

(22) Filed: Dec. 17, 2008

(65) Prior Publication Data

US 2009/0161249 A1 Jun. 25, 2009

(30) Foreign Application Priority Data

Dec. 19, 2007 (JP) .................................. 2007-327102

(51) Int. Cl.
*G11B 5/09* (2006.01)
*G11B 5/584* (2006.01)
(52) U.S. Cl. ....................... 360/48; 360/77.12
(58) Field of Classification Search ........................ None
See application file for complete search history.

(56) References Cited

U.S. PATENT DOCUMENTS

| | | |
|---|---|---|
| 5,055,951 A | 10/1991 | Behr |
| 5,602,703 A | 2/1997 | Moore et al. |
| 5,689,384 A | 11/1997 | Albrecht et al. |
| 6,040,963 A | 3/2000 | Rothermel |
| 6,141,174 A | 10/2000 | Judge et al. |
| 6,222,698 B1 | 4/2001 | Barndt et al. |
| 6,275,350 B1 | 8/2001 | Barndt |
| 7,170,709 B2 | 1/2007 | Okafuji et al. |
| 7,480,114 B2 * | 1/2009 | Cherubini et al. ......... 360/73.12 |
| 7,675,710 B2 * | 3/2010 | Hennecken et al. .......... 360/129 |
| 7,760,465 B2 * | 7/2010 | Koeppe ......................... 360/121 |
| 2006/0291090 A1 * | 12/2006 | Dugas et al. ............... 360/77.12 |
| 2007/0070870 A1 * | 3/2007 | Rothermel ................. 369/275.2 |
| 2009/0109566 A1 * | 4/2009 | Tanaka et al. .............. 360/77.12 |
| 2010/0067139 A1 * | 3/2010 | Bates et al. ...................... 360/71 |

FOREIGN PATENT DOCUMENTS

| | | |
|---|---|---|
| JP | 9-161250 | 6/1997 |
| JP | 11-16137 | 1/1999 |
| JP | 2009-110621 | 5/2009 |

* cited by examiner

*Primary Examiner* — Daniell L Negron
*Assistant Examiner* — Regina N Holder
(74) *Attorney, Agent, or Firm* — Oblon, Spivak, McClelland, Maier & Neustadt, L.L.P.

(57) ABSTRACT

Provided is a magnetic tape that includes a data band, including servo patterns, data, and a guard space. The servo patterns is formed along a longitudinal direction of the magnetic tape with an interval provided between each of the servo patterns, each of the servo patterns formed across a full width of the data band. The data is recorded between the servo patterns. The guard space is left between each of the servo patterns and the data.

21 Claims, 19 Drawing Sheets

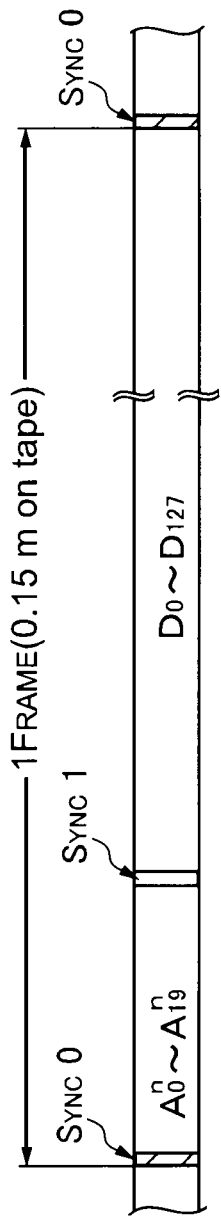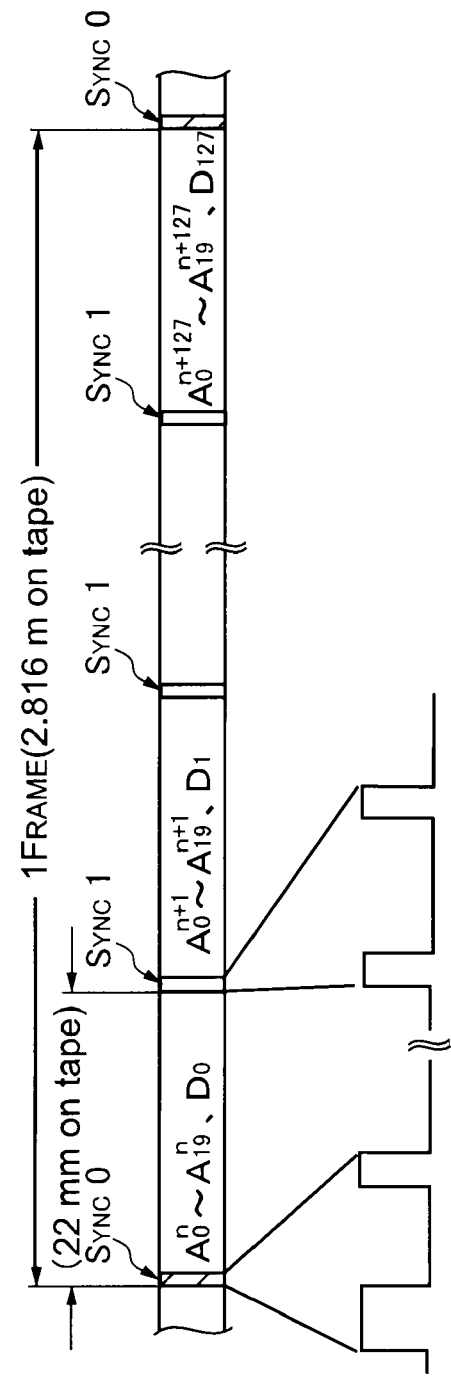
FIG.16A
FIG.16B

MAGNETIC TAPE, MAGNETIC TAPE APPARATUS, SERVO PATTERN RECORDING APPARATUS, MAGNETIC TAPE PRODUCING METHOD, AND MAGNETIC TAPE RECORDING METHOD

CROSS REFERENCES TO RELATED APPLICATIONS

The present invention contains subject matter related to Japanese Patent Application JP 2007-327102 filed in the Japanese Patent Office on Dec. 19, 2007, the entire contents of which being incorporated herein by reference.

BACKGROUND OF THE INVENTION

1. Field of the Invention

The present invention relates to a magnetic tape, a servo pattern recording apparatus for the magnetic tape, a magnetic tape apparatus such as a linear magnetic tape apparatus, a method of producing the magnetic tape, and a recording method of the magnetic tape.

2. Description of the Related Art

Track-following servo control of the related art involves, for example, providing a longitudinal servo track previously recorded between longitudinal data track groups, the servo track being parallel to the data track groups, so that the servo track can be read by one or a plurality of servo heads, adjusting a position of the head or tape in a tape width direction by a subsidiary track-following servo, and maintaining the servo head at a desired position in the tape width direction with respect to the servo track, to thus position a data head at a center of a data track.

U.S. Pat. No. 5,689,384, for example, describes a track-following servo system. U.S. Pat. No. 5,689,384 also describes a timing based servo system. The timing based servo system is used together with an LTO (Linear Tape-Open) format, and an example thereof includes an LTO Ultrium (registered trademark) magnetic tape drive available from IBM and a tape cartridge associated therewith.

A linear servo track includes, for example, perceptible transition patterns each constituted of magnetization changes recorded in advance. Those transitions form a timing based servo pattern constituted of a sequence of repetitive circulatory cycles of transitions of two different azimuthal orientations extending in the tape width direction on the linear servo track. For example, the timing based servo pattern includes a transition tilted in a first direction with respect to a direction of the linear servo track, that is, a transition having an azimuthal orientation in the first direction, and a transition tilted in the opposite direction, that is, a transition having an azimuthal orientation in the opposite direction, the two transitions being arranged alternately. Therefore, when a medium moves linearly with respect to a servo read head, a position of the servo read head in the tape width direction with respect to the timing based servo track is detected based on a scale obtained by comparing a time between the two transitions having different azimuthal orientations with a time between two transitions having parallel azimuthal orientations. A relative timing of the transitions read by the servo read head changes linearly in accordance with the position of the head in the tape width direction. Therefore, it is possible to position a plurality of parallel data tracks at different positions in the tape width direction across the servo track (see, for example, U.S. Pat. No. 5,689,384).

SUMMARY OF THE INVENTION

Since a thorough study is already made on increasing a linear bit density to thus enhance a surface recording density of a linear magnetic tape apparatus, increasing a track density is now most effective. However, an increase in the track density is known to raise the following issues. Specifically, there arise issues on how to detect tracking information with high sensitivity and, with respect to a generally-used two-bump-type head, how to cope with a tilt in running of the magnetic tape, how to cope with a deformation of the magnetic tape (in width and longitudinal directions), and how to make a head channel spacing smaller.

Generally, the magnetic tape is divided into multiple pieces (e.g., four) in the width direction, and a data band and a servo band are provided thereto in the width direction of the magnetic tape. A servo pattern for tracking is recorded in advance on the servo band before shipment of the magnetic tape. When writing data to the data band or reading data therefrom, the servo pattern is reproduced to detect information on the relative position of the head (information on a time-to-time position in the width direction of the magnetic tape). As a result, a recording head or a reproducing head is always maintained at a correct position (tracking). Therefore, an additional channel for reproducing the servo pattern is provided to the head on an outer side of a data channel.

During data recording in the linear magnetic tape apparatus that uses the two-bump-type head, data is first recorded by a recording head of an upstream bump and reproduced by a reproducing head of a downstream bump immediately thereafter, to thus check whether the data has been correctly recorded (which is called "read-after-write" or "read-while-write"). It should be noted that in descriptions below, the reproducing head (reproducing channel) refers to one located on either the upstream (recording side) bump or the downstream (reproducing side) bump unless stated otherwise.

A single two-bump-type head is obtained by inversely attaching two head blocks, each of which has the reproducing head piggybacked on the recording head (or vise versa), such that a first bump is provided with the recording head and the reproducing head in the stated order and a second bump is provided with the reproducing head and the recording head in the stated order (or vise versa). Thus, the recording head of the first bump is aligned on the track with the reproducing head of the second bump, and the reproducing head of the first bump is aligned on the track with the recording head of the second bump.

By thus distancing a recording gap and a reproducing gap by about 1 mm, crosstalk from the recording head to the reproducing head is suppressed.

Further, during recording, although the reproducing head located on the same bump as the recording head corresponds to a servo channel placed on the outer side of the data channel, the reproducing head cannot be used for reproduction of a servo signal due to the crosstalk from the recording head. Therefore, the servo signal is detected by the servo channel of the reproducing head set apart in the running direction of the magnetic tape, thereby controlling the position of the recording head. When the running of the magnetic tape is tilted in this state, the position of the recording head is deviated that much from its correct position, resulting in a limitation of the track density. In a normal method, a gap line of the first bump and a gap line of the second bump are required to be brought closer to each other for suppressing an influence of the tilt of the running of the magnetic tape. However, due to the restrictions of crosstalk and the like, it is difficult to reduce the distance between the gap lines.

Specifically, the tracking operation involves constantly positioning the reproducing gap at a track center as a reference. Therefore, when a direction in which the tape runs on a front surface side of the head (tilt) changes dynamically (tape meandering), the position of the recording gap is caused of a track deviation (track misregistration) by an amount corresponding to a tangent of a tilt angle and a distance between the gaps (in the longitudinal direction). In other words, due to an offset of the position of the recording track, because the adjacent track that is already recorded is partially overwritten and a track width thereof is narrowed, a tracking margin is cut. It should be noted that at a time of reproduction, since the head for the data reproduction and the head for the servo signal reproduction are positioned on the same gap line, this problem (track misregistration of reproducing gap) does not occur. Strictly speaking, although the tilt of the running of the tape effectively changes an inter-track distance of the head to thus cause track misregistration, since "(1−cosine of tilt angle)*data band width/2" and "reproducing head track width<recording head track width", the influence is small. On the other hand, it is difficult to detect the servo signal using the reproducing gap located on the recording-side bump during recording due to the crosstalk from the recording head.

In view of the circumstances as described above, there is a need for a magnetic tape to/from which data can be accurately recorded/reproduced, a servo pattern recording apparatus for the magnetic tape, a magnetic tape apparatus capable of detecting information on a deformation (expansion/contraction in width and longitudinal directions) of the magnetic tape and tilt information of the magnetic tape, a method of producing the magnetic tape, and a recording method of the magnetic tape.

According to an embodiment of the present invention, there is provided a magnetic tape that includes a data band, including servo patterns, data, and a guard space. The servo patterns are formed along a longitudinal direction of the magnetic tape with an interval provided between each of the servo patterns, each of the servo patterns formed across a full width of the data band. The data is recorded between the servo patterns. The guard space is left between each of the servo patterns and the data.

In other words, according to the embodiment of the present invention, there is provided, as the magnetic tape that suppresses the influence of the tilt of the running of the magnetic tape that is caused when using the two-bump-type head, a magnetic tape including embedded-type servo patterns.

In the embodiment of the present invention, the data is recorded between each of the servo patterns formed along the longitudinal direction of the magnetic tape with intervals therebetween, each of the servo patterns formed across the full width of the data band. In other words, the data band usually provided into multiple pieces in the width direction of the magnetic tape is provided with, in the stated order, the servo pattern, the guard space, the data, the guard space, the servo pattern, the guard space, the data, and so on, for example.

For recording the data as described above, under the presupposition that the servo patterns are recorded in advance, the reproducing channel located on the same bump as the recording head usually reproduces the plurality of servo patterns first at a start of the recording (no recording current is supplied during reproduction) to thus control the position of the head, and the recording operation is started thereafter. Specifically, a recording current is supplied to the recording head to record data, and the recording current is stopped after a certain time period (right before next servo pattern). The reproducing head of the same bump then reproduces the next servo pattern to detect the positional information of the head, and again returns to the recording immediately thereafter. Hereinafter, the recording, reproduction, and head position control are repeated until the recording is completed. During recording, the reproducing head of the downstream bump is used to perform read-after-write (or read-while-write). In other words, in a case of positioning the recording head using the reproducing head located on a bump different from that of the recording head during recording, there arises a problem that due to the tilt of the running of the magnetic tape, the position of the recording track is deviated and the recording head thus enters a region of the adjacent track (may overwrite data on the already-recorded adjacent track or data may be overwritten by the adjacent track in the recording afterwards). Meanwhile, in the embodiment of the present invention, by alternately using the recording head and the reproducing head located on the same bump time-divisionally for data recording and detection of the position of the recording head, it becomes possible to reproduce the servo patterns using the reproducing head attached closer to (piggybacked on) the recording head and record the data at the correct position while avoiding the problem that is caused when the magnetic tape is run with a tilt. Moreover, the problem of crosstalk from the recording head to the reproducing head during recording can be suppressed.

At a time of reproduction, the servo patterns are reproduced by the reproducing head also used in data reproduction (which reproducing head located on what bump is used also depends on a design of the head block), to thus control the position of the head.

The data bands are regions formed by dividing the magnetic tape in the width direction, each of the data bands provided along an entire length of the magnetic tape. The data band is constituted of "data subband x number of channels of head that records and reproduces data in parallel". Normally, the data recording/reproduction is carried out on one data band first and then the next data band.

The data subbands are regions provided along the entire length of the magnetic tape, each of the data subbands having a width corresponding to a channel spacing of the two-bump-type head. One channel to which a multi-channel head for recording/reproducing data in parallel corresponds is a region in which a reciprocating (1 reciprocation=2 paths, not necessarily side by side) scan conducted a given number of times ends while changing positions in the magnetic tape width direction for each path.

The head channel spacing is a distance between center lines of adjacent channels of the multi-channel head that records/reproduces data in parallel. Not all the channels have to be on the same gap line (the gap may be placed two-dimensionally or adjacent channels may be provided over a plurality of head blocks).

Each of the servo patterns is formed across the full width of the data band (may be discontinuous) and constituted of a plurality of segments arranged in the width direction. The servo patterns are a combination of magnetization changes (reversals) used for controlling the position of the two-bump-type head in the magnetic tape width direction (tracking) or controlling velocity/phase of the magnetic tape. The servo patterns are placed in the longitudinal direction of the magnetic tape with intervals therebetween. The servo patterns are recorded on the magnetic tape in advance before the shipment of the magnetic tape and are not rewritten by individual magnetic tape apparatuses. The boundary of the segments is a virtual line connecting changing points of azimuth angles (line in the longitudinal direction of the magnetic tape).

The guard space is a region (gap) separating the servo pattern and a data burst (data) and serves to absorb fluctuations of a position of the data burst in the longitudinal direction of the magnetic tape caused during data recording. The guard space is necessary at all times as a format.

The servo patterns may be formed by first recording servo patterns on the magnetic tape using the servo pattern recording head having a recording gap that has the same shape as the boundary of the different magnetizations, and partially erasing, using a subsequent full-width erasing head, the recorded servo pattern so as to form a data recording portion. The magnetization changes include a reversal. The boundary is located within a recording surface of the magnetic tape, and the magnetization changes (reversal) are based on a change in a recording current.

Accordingly, servo patterns whose lengths are short in the tape running direction can be formed.

It is desirable that each of the servo patterns is constituted of, on the data band, at least two segments arranged in a width direction of the data band, and adjacent segments are recorded with different azimuth angles (number of segments≧number of azimuth angles).

Accordingly, in addition to positioning information of the magnetic head (tracking information) and velocity information of the magnetic tape, it becomes possible to detect deformation (expansion/contraction in width and longitudinal directions) information of the magnetic tape and tilt information of the magnetic tape by the magnetic tape apparatus.

As the azimuth angles imparted to the segments of each of the servo patterns, at least two among positive and negative angles having the same absolute value, and an angle of 0 degree may be used.

Accordingly, in addition to the positioning information of the magnetic head (tracking information) and the velocity information of the magnetic tape, it becomes possible to detect the deformation (expansion/contraction in width and longitudinal directions) information of the magnetic tape and the tilt information of the magnetic tape by the magnetic tape apparatus.

It is desirable that the servo patterns be formed along the longitudinal direction of the magnetic tape at regular intervals.

Accordingly, it becomes possible to periodically provide servo information by the magnetic tape and, at the same time, facilitate control of the tape velocity.

A width of each of the segments of the servo pattern constituted of at least two segments arranged in the width direction of the data band may be substantially equal to an integral multiple of a track pitch of the data track on which the data is recorded.

Accordingly, the servo pattern is placed over a plurality of data tracks in the width direction of the data band.

It is also possible that, when there are a plurality of data bands in the width direction of the magnetic tape, positions of the servo patterns of adjacent data bands become the same in the longitudinal direction, and the azimuth angles of magnetization changes forming the servo patterns are azimuth angles having different signs between the segments on both sides of a virtual boundary between the adjacent data bands. The magnetization changes may include a reversal, and the azimuth angles of the segments on both sides of the virtual boundary between the data bands may both be set to 0 degree.

Alternatively, it is also possible that, when there are a plurality of data bands in the width direction of the magnetic tape, the positions of the servo patterns of the adjacent data bands become substantially the same in the longitudinal direction, and the azimuth angles of the magnetization changes forming the servo patterns are azimuth angles having the same sign in the segments on both sides of the virtual boundary between the adjacent data bands. The magnetization changes may include a reversal, and the azimuth angles of the segments on both sides of the virtual boundary between the data bands may both be set to 0 degree.

Accordingly, the positioning information of the magnetic head, the deformation information of the magnetic tape, and/or the tilt information of the magnetic tape can be detected by the magnetic tape apparatus. The latter is effective in expanding a dynamic range of the head positioning information.

In recording the servo patterns across the full width of the magnetic tape by a servo pattern full-width recording head including a recording gap that has the same shape as a boundary of the different magnetizations of the servo patterns, the number of changes in a recording current (including reversal) for each of the servo patterns may be one of all odd and all even. The magnetization changes include a reversal. The boundary is located within a recording surface of the magnetic tape, and the magnetization changes (reversals) are based on the change in the recording current.

Accordingly, initial magnetization states (directions) of data recording regions (regions in which data bursts are recorded) each of which is interposed between the servo patterns can be selected to be opposite or the same before and after the servo pattern. In other words, initial (before data is first recorded by magnetic tape apparatus) magnetization states (directions) of a large number of data recording regions formed on the magnetic tape can be reversed alternately or can all be made the same.

In recording the servo patterns across the full width of the magnetic tape by a servo pattern full-width recording head including a recording gap that has the same shape as a boundary of the different magnetizations of the servo patterns, a timing of each of the changes in the recording current may be modulated so that one of binary data and a unique synchronization signal is expressed within each of the servo patterns. The magnetization changes include a reversal. The boundary is located within the recording surface of the magnetic tape, and the magnetization changes (reversals) are based on the change in the recording current.

Accordingly, binary data or a unique synchronization signal can be expressed by modulating the timing of each of the changes (including reversals) in the recording current.

In erasing, by the subsequent full-width erasing head, the part of the servo patterns recorded in advance on the magnetic tape by the servo pattern recording head including the recording gap that has the same shape as the boundary of the different magnetizations of the servo patterns to thus form the data recording region, modulation of a recording current and an operation timing of the subsequent full-width erasing head may be controlled so that one of binary data and a unique synchronization signal is expressed within each of the servo patterns. The magnetization changes include a reversal. The boundary is located within the recording surface of the magnetic tape.

Accordingly, binary data or a unique synchronization signal can be expressed within each of the servo patterns by controlling the modulation of the recording current and the operation timing of the subsequent full-width erasing head.

Each of the servo patterns may correspond to 1-bit data or the unique synchronization signal.

Accordingly, 1-bit data or the unique synchronization signal can be provided by the servo patterns.

When inserting address information in the servo pattern, by the servo pattern in which the unique synchronization signal is inserted preceding the servo pattern in which the address information is inserted, frame synchronization of the address information can positively be carried out.

The magnetic tape may be produced by using a servo pattern recording apparatus that uses an address generator having modulo sufficiently longer than the magnetic tape at a maximum possible length for the servo pattern recording apparatus to handle in inserting address information in the servo pattern, and resets an address of the address generator every time a raw magnetic tape is loaded to the servo pattern recording apparatus. The raw magnetic tape includes an unrecorded magnetic tape.

Accordingly, address information can be recorded on the magnetic tape.

According to another embodiment of the present invention, there is provided a magnetic tape apparatus including a recording head and a reproducing head. The recording head records data between servo patterns formed on a magnetic tape along a longitudinal direction of the magnetic tape with an interval provided between each of the servo patterns, each of the servo patterns formed across a full width of a data band of the magnetic tape, leaving a guard space between a servo pattern and recorded data. The reproducing head reproduces the data recorded on the magnetic tape.

In the embodiment of the present invention, the data band usually provided into multiple pieces in the width direction of the magnetic tape is provided with, in the stated order, the servo pattern, the guard space, the data, the guard space, the servo pattern, the guard space, the data, and so on, for example.

For recording the data as described above, under the presupposition that the servo patterns are recorded in advance, the reproducing channel located on the same bump as the recording head usually reproduces the plurality of servo patterns first at a start of the recording (no recording current is supplied during reproduction) to thus control the position of the head, and the recording operation is started thereafter. Specifically, a recording current is supplied to the recording head to record data, and the recording current is stopped after a certain time period (right before next servo pattern). The reproducing head of the same bump then reproduces the next servo pattern to detect the positional information of the head, and again returns to the recording immediately thereafter. Hereinafter, the recording, reproduction, and head position control are repeated until the recording is completed. During recording, the reproducing head of the downstream bump is used to perform read-after-write (or read-while-write). In other words, in a case of positioning the reproducing head using the reproducing head located on a bump different from that of the recording head during recording, there arises a problem that due to the tilt of the running of the magnetic tape, the position of the recording track is deviated and the recording head thus enters a region of the adjacent track (may overwrite data on the already-recorded adjacent track or data may be overwritten by the adjacent track in the recording afterwards). Meanwhile, in the embodiment of the present invention, by alternately using the recording head and the reproducing head located on the same bump time-divisionally for data recording and detection of the position of the recording head, it becomes possible to reproduce the servo patterns using the reproducing head attached closer to (piggybacked on) the recording head and record the data at the correct position while avoiding the problem that is caused when the magnetic tape is run with a tilt. Moreover, the problem of crosstalk from the recording head to the reproducing head during recording can be suppressed.

At a time of reproduction, the servo patterns are reproduced by the reproducing head also used in data reproduction (which reproducing head located on what bump is used also depends on a design of the head block), to thus control the position of the head.

Accordingly, in addition to the positioning information of the magnetic head (tracking information) and the velocity information of the magnetic tape, it becomes possible to detect the deformation (expansion/contraction in width and longitudinal directions) information of the magnetic tape and the tilt information of the magnetic tape by the magnetic tape apparatus.

In the magnetic tape apparatus according to the embodiment of the present invention, at least two channels from among data channels of the reproducing head may be used for reproducing the servo patterns, and at least one of positioning information of one of the recording head and the reproducing head, deformation information of the magnetic tape, and tilt information of the magnetic tape may be detected based on a correlation between reproduced servo signals from the data channels, on magnetic tape velocity information, and on channel information of the reproducing head.

Accordingly, the positioning information of the recording head or the reproducing head, the deformation information of the magnetic tape, and/or the tilt information of the magnetic tape can be detected.

In the magnetic tape apparatus according to the embodiment of the present invention, at least two channels from among data channels and servo assisting channels of the reproducing head may be used for reproducing the servo patterns, and at least one of positioning information of one of the recording head and the reproducing head, deformation information of the magnetic tape, and tilt information of the magnetic tape may be detected based on a correlation between reproduced servo signals from the channels, on magnetic tape velocity information, and on channel information of the reproducing head.

Accordingly, the positioning information of the recording head or the reproducing head, the deformation information of the magnetic tape, and/or the tilt information of the magnetic tape can be detected. At the same time, a dynamic range in detecting the head positioning information can be expanded.

The positioning information of one of the recording head and the reproducing head in the track width direction may be obtained by reproducing the segments of each of the servo patterns having different azimuth angles by reproducing channels respectively corresponding thereto, and combining one of a lapse time between output signals thereof and a difference between times of the output signals timed with a clock inside the magnetic tape apparatus, with magnetic tape velocity information and a reference value determined in advance for each combination of the corresponding reproducing channels.

Accordingly, the positioning information of the recording head or the reproducing head in the track width direction can be obtained.

The segment of the servo pattern having a positive azimuth angle and the segment thereof having a negative azimuth angle may be reproduced by the reproducing channels respectively corresponding thereto.

Accordingly, information of the segment of the servo pattern having the positive azimuth angle and information of the segment thereof having the negative azimuth angle can be reproduced by the reproducing channels respectively corresponding thereto.

The positioning information may be obtained by combining first information on a position obtained based on a combination of first positive/negative azimuth angles and second information on a position obtained based on a combination of second positive/negative azimuth angles larger than the first azimuth angles. The first information is, for example, low-sensitive, wide dynamic range information on the position, and the second information is, for example, high-sensitive, narrow dynamic range information on the position.

Accordingly, it becomes possible to roughly adjust the position of the head using the low-sensitive information, and use the high-sensitive information thereafter to carry out accurate positioning (tracking) of the head. In other words, the contradictory conditions of high-sensitive and wide dynamic range can be satisfied.

At least one of the deformation information of the magnetic tape and the tilt information of the magnetic tape may be detected by combining a first value obtained by reproducing the segment of the servo patterns having an azimuth angle other than 0 degree by two first reproducing channels corresponding thereto, the first value being one of a lapse time between reproduced signals thereof and a difference between times of the reproduced signals timed with a clock inside the magnetic tape apparatus, a second value obtained by reproducing the segment of the servo patterns having an azimuth angle opposite to that of the segment reproduced by the first reproducing channels, by two second reproducing channels corresponding thereto, magnetic tape velocity information, and channel information of the reproducing head.

Accordingly, the deformation information of the magnetic tape and/or the tilt information of the magnetic tape can be detected.

The tilt information of the magnetic tape may be detected by reproducing the segment of the servo patterns having a 0-degree azimuth angle by two corresponding reproducing channels, and combining one of a lapse time between reproduced signals thereof and a difference between times of the reproduced signals timed with a clock inside the apparatus, with magnetic tape velocity information and channel information of the reproducing head.

Accordingly, the tilt information of the magnetic tape can be detected.

The deformation information of the magnetic tape may be obtained by: detecting information as a mixture of the deformation information and tilt information of the magnetic tape, which is obtained by reproducing two first segments of the servo patterns having the same azimuth angle other than 0 degree by a first reproducing channel pair, to thus obtain one of a lapse time between reproduced signals thereof and a difference between times of the reproduced signals timed with a clock inside the magnetic tape apparatus, reproducing two second segments of the servo patterns having the same azimuth angle that is opposite to that of the first segments by a second reproducing channel pair, to thus obtain one of a lapse time between reproduced signals thereof and a difference between times of the reproduced signals, and combining them with tape velocity information and channel information of the reproducing head; and using the tilt information of the magnetic tape detected by reproducing a segment having a 0-degree azimuth angle by a third reproducing channel pair.

Accordingly, the deformation information of the magnetic tape can be obtained by using the tilt information thereof.

The lapse time or measured time difference between the output signals may be detected as a phase difference by a burst phase comparator.

Accordingly, the phase difference (i.e., time information above) can be detected by the burst phase comparator.

The positioning information of one of the recording head and the reproducing head in the track width direction may be corrected using at least one of the deformation information of the magnetic tape and the tilt information thereof.

Accordingly, the recording head and/or the reproducing head can be positioned at a more accurate position in the track width direction.

A tilt angle of one of the recording head and the reproducing head may be controlled in accordance with the tilt information of the magnetic tape. The tilt angle includes the azimuth angle.

Accordingly, the recording head and/or the reproducing head can be positioned at a more accurate position.

The magnetic tape velocity information may be set velocity information (target value) and/or the magnetic tape velocity information may be obtained by measuring a cycle of a reproduced servo pattern. The set velocity information includes information on a target value of the velocity.

Accordingly, the velocity of the magnetic tape can be obtained.

When a segment having a 0-degree azimuth angle exits within the servo pattern, the velocity information may be obtained by measuring a cycle of an output servo pattern of a channel that reproduces the segment.

Accordingly, accurate velocity information can be obtained.

When a segment having a 0-degree azimuth angle is absent within the servo pattern, a cycle of an output servo pattern of a reproducing channel corresponding to a segment having a positive azimuth angle and a cycle of an output servo pattern of a reproducing channel corresponding to a segment having a negative azimuth angle may be measured, and an operation that takes into account an absolute value of the azimuth angles may be carried out, to thus obtain velocity information.

Assuming that $\alpha 1$ and $\alpha 2$ represent (known) azimuth angles of the servo pattern and the tape is raised (head is relatively lowered) by $\Delta d$ while the tape is run from an (n−1)-th servo pattern to an n-th servo pattern, $\Delta d1(\sim dn-dn-1)$, $dn-1$, $dn$: position (calculated value) of head at n−1 and n $T1=T01+\Delta d1 \tan(-\alpha 1+\Delta \gamma 1)$, T1: time (actual measured value) from n−1 to n $T01=T1+\Delta d1 \tan(\alpha 1-\Delta \gamma 1)$, T01: cycle obtained from T1

$\Delta \gamma 1=\arctan(\Delta d1/T01) \ll \alpha 1$

Therefore, $T01=T1+\Delta d1 \tan \alpha 1$

Similarly, $T02=T2-\Delta d2 \tan \alpha 2$ $T0=(T01+T02)/2$, T0: estimated cycle $T0=((T1+T2)/2)+\Delta d1 \tan \alpha 1 - \Delta d2 \tan \alpha 2$ The servo patterns having positive and negative azimuth angles are positioned at substantially the same position on the tape in the longitudinal direction. Thus, $\Delta d1=\Delta d2=\Delta d$ Therefore, $T0=((T1+T2)/2)+\Delta d(\tan \alpha 1 - \tan \alpha 2)$ It should be noted that when taking the tape deformation into account, it is only necessary that a1 above be set to $(\alpha 1-\beta)$, and $\alpha 2$ above be set to $(\alpha 2-\beta)$ (see, for example, FIG. 18).

Accordingly, the velocity information can be obtained even when a segment having a 0-degree azimuth angle is absent within the servo pattern.

The magnetic tape velocity information may be obtained by successively reproducing the segment in the servo pattern having a 0-degree azimuth angle with a reproducing head of an upstream bump and a reproducing head of a downstream bump on a running magnetic tape, and using one of a lapse time and a measured time difference, and an inter-gap distance of the reproducing heads.

Accordingly, the magnetic tape velocity information can be obtained by using the reproducing head placed upstream and the reproducing head placed downstream on the running magnetic tape.

The velocity information may be obtained by carrying out, after successively reproducing the segments of the servo patterns having positive and negative azimuth angles by the reproducing head placed upstream and the reproducing head placed downstream and obtaining first velocity information and second velocity information based on one of a lapse time and a measured time difference, and an inter-gap distance of the reproducing head placed upstream and the reproducing head placed downstream, respectively, an operation that takes into account the channel information of the reproducing head used and information on the azimuth angles.

Accordingly, the segments having the positive and negative azimuth angles can be successively reproduced with the reproducing head placed upstream and the reproducing head placed downstream to thus obtain the velocity information.

In the magnetic tape apparatus according to the embodiment of the present invention, when a segment having a 0-degree azimuth angle exists within the servo patterns in a case of phase-locking the magnetic tape, a frequency of an output servo pattern of a channel that reproduces the segment may be demultiplexed as necessary to thus be phase-compared with a reference signal.

As is well known, a limit of a phase detector in detecting a phase is ±90 degrees in the case of a multiplication type phase detector, which has a simplest structure, and ±180 degrees in the case of a more sophisticated phase detector. Excess of those ranges leads to an output of a result of a phase comparison with the next transition. Specifically, when there is a difference in the frequency between the reference signal and a VFO (Variable Frequency Oscillator), a 1:1 phase comparison cannot be carried out on the transitions, and the output of the detector is dominated by a frequency component of the difference between the frequencies. The problem in forming a phase lock loop concerns whether the VFO has favorable responsiveness and whether synchronization can be started after a quick response to the frequency component. The VFO accompanied by a mechanical system such as a tape running system has poor response. However, when the frequency in the phase comparison is lowered (demultiplexed), an absolute value of a time window corresponding to the range of ±90 degrees or ±180 degrees increases. Consequently, it becomes easier to start the synchronization at a certain point. However, because a phase synchronizing system is also a sampling system, the frequency in the phase comparison is higher the better in terms of sampling. Therefore, a degree of the demultiplication is determined based on a balance between the quick capture and accuracy after synchronized.

Accordingly, the magnetic tape can be phase-locked when there is a segment having a 0-degree azimuth angle within the servo pattern.

In the magnetic tape apparatus according to the embodiment of the present invention, when a segment having a 0-degree azimuth angle is absent within the servo pattern in a case of phase-locking the magnetic tape, a frequency of an output servo pattern of a reproducing channel corresponding to a segment having a positive azimuth angle may be demultiplexed by a predetermined demultiplex ratio to thus be phase-compared with a first reference signal, a frequency of an output servo pattern of a reproducing channel corresponding to a segment having a negative azimuth angle may be demultiplexed by the same demultiplex ratio to thus be phase-compared with a second reference signal, and an operation that takes into account an absolute value of the azimuth angles may be carried out on an output of each phase comparator, to thereby lock the phase of the magnetic tape. There is also a case where the second reference signal is substantially the same (same frequency) as the first reference signal. Meanwhile, when the output of the channel having the positive azimuth angle and the output of the channel having the negative azimuth angle largely differ from each other, the first reference signal and the second reference signal are considered to be signals having the same frequency but with different phases.

Assuming that $\alpha1$ and $\alpha2$ represent (known) azimuth angles of the servo pattern and the tape is raised (head is relatively lowered) by d while the tape is run by $\Delta T$, since $\Delta T_-$ distance (or lapse time) between segment having azimuth angle $\alpha1$ and REF (reference)

$\Delta T_+$ distance (or lapse time) between segment having azimuth angle $\alpha2$ and REF (reference), the following equation can be obtained.

$$\Delta T = (\Delta T_- + \Delta T_+)/2 + d(\tan\alpha1 - \tan\alpha2)$$

It should be noted that when taking the tape deformation into account, it is only necessary that $\alpha1$ above be set to $(\alpha1-\gamma)$, $(\alpha1-\beta-\gamma)$, and $\alpha2$ above be set to $(\alpha2+\gamma)$ and $(\alpha2-\beta+\gamma)$ (see, for example, FIG. 19).

Accordingly, the magnetic tape can be phase-locked when there is no segment having a 0-degree azimuth angle within the servo pattern.

In the magnetic tape apparatus according to the embodiment of the present invention, the reproducing head that is piggybacked on the recording head placed upstream may be used to reproduce the servo patterns during recording of the magnetic tape.

Accordingly, the data can be recorded by the recording head of the upstream bump, and the servo patterns can be reproduced by the reproducing head of the upstream bump.

In the magnetic tape apparatus according to the embodiment of the present invention, the reproducing head placed downstream may be used to reproduce the servo patterns at a time of reproducing the data.

Accordingly, in data reproduction, the reproducing head of the downstream bump can be used to reproduce the servo patterns.

At a time of recording data, the reproducing head placed downstream may be used to reproduce the servo patterns. In this case, the head positioning is offset in accordance with the detected tilt of the tape and the distance between the recording gap and the reproducing gap in the longitudinal direction.

Accordingly, at the time of recording data, the reproducing head placed downstream can be used to reproduce the servo patterns.

At the time of reproducing data, the reproducing head piggybacked on the recording head placed upstream may be used to reproduce the servo patterns. In this case, the head positioning is offset in accordance with the detected tilt of the tape and the distance between the recording gap and the reproducing gap in the longitudinal direction.

Accordingly, at the time of reproducing data, the reproducing head piggybacked on the recording head placed upstream can be used to reproduce the servo patterns.

The magnetic tape apparatus stores information on a deviation of individual positions of at least one of the recording gap and the reproducing gap of the recording head and the reproducing head with respect to a reference position, and the stored information is used to correct at least one of the positioning information of the recording head and the reproducing head, the deformation information of the magnetic tape, the tilt information of the magnetic tape, the magnetic tape velocity information, and phase information of the magnetic tape.

Accordingly, at least one of the positioning information of the recording head and the reproducing head, the deformation information of the magnetic tape, the tilt information of the magnetic tape, the magnetic tape velocity information, and the phase information of the magnetic tape can be corrected.

In the magnetic tape apparatus according to the embodiment of the present invention, identification information of at least one of the data band and a path may be inserted at a predetermined position in a region for each path as a constituent element of a data region interposed between the servo patterns.

Accordingly, the identification information of the data band and/or path can be identified at the predetermined position of the data region by the magnetic tape apparatus.

In the magnetic tape apparatus according to the embodiment of the present invention, a data region interposed between the servo patterns, one of the servo patterns adjacent to the data region, and a guard space attached thereto may be considered as a unit for each path, and an integral multiple of the unit may be handled as a physical block.

The data burst is a region interposed between the servo patterns on the data band and includes partial data of one path. In each of the regions, data bursts of a given number of paths (2× reciprocation count) are multiplexed in the width direction of the magnetic tape (multiplexed while changing track positions for each path).

Accordingly, data management becomes easier.

In the magnetic tape apparatus according to the embodiment of the present invention, a data region interposed between the servo patterns, one of the servo patterns adjacent to the data region, and a guard space attached thereto may be considered as a unit for each path, and at least one unit may be used as a tape mark. The tape mark includes a file mark. The tape mark (file mark) indicates an end of data.

Accordingly, the magnetic tape can be handled more easily.

According to another embodiment of the present invention, there is provided a servo pattern recording apparatus including a recording head and a controlling means. The recording head includes a recording gap that has the same shape as a boundary of different magnetizations of servo patterns to be recorded on a magnetic tape, the recording head used to record the servo patterns across a full width of the magnetic tape. The controlling means controls, in recording the servo patterns across the full width of the magnetic tape by the recording head, the number of changes in a recording current of the servo patterns to be one of all odd and all even. The magnetization changes include a reversal. The boundary is located within the recording surface of the magnetic tape, and the magnetization changes (reversal) are based on the change in the recording current.

In the embodiment of the present invention, the control means can control the number of changes of the recording current (including reversal) to be all odd or all even, and a full-width recording head for the servo patterns can be used to record the servo patterns across the full width of the magnetic tape.

According to another embodiment of the present invention, there is provided a servo pattern recording apparatus including a recording head and a full-width erasing head. The recording head includes a recording gap that has the same shape as a boundary of different magnetizations of servo patterns to be recorded on a magnetic tape, the recording head used to record the servo patterns across a full width of the magnetic tape. The subsequent full-width erasing head forms each of the servo patterns by erasing a part of the servo patterns recorded on the magnetic tape by the recording head in advance, to thus form a data recording region.

Accordingly, servo patterns whose widths (or lengths) are short in the running direction of the magnetic tape can be formed.

In the servo pattern recording apparatus according to the embodiment of the present invention, in recording the servo patterns across the full width of the magnetic tape by the recording head, a timing of each of the changes in the recording current may be modulated so that one of binary data and a unique synchronization signal is expressed within each of the servo patterns. The magnetization changes (reversal) are based on the change in the recording current.

Accordingly, it becomes possible to modulate the timing of each of the changes in the recording current (including reversal) to thus express the binary data or the unique synchronization signal.

In the servo pattern recording apparatus according to the embodiment of the present invention, in erasing, by the subsequent full-width erasing head, the part of the servo patterns recorded on the magnetic tape by the recording head in advance to thus form the data recording region, modulation of a recording current and an operation timing of the subsequent full-width erasing head may be controlled so that one of binary data and a unique synchronization signal is expressed within each of the servo patterns.

Accordingly, the modulation of the recording current and the operation timing of the subsequent full-width erasing head can be controlled to thus express the binary data or the unique synchronization signal within the servo patterns.

The servo patterns may correspond to one of 1-bit data and a unique synchronization signal.

Accordingly, 1-bit data or a unique synchronization signal can be provided by the servo patterns.

An address generator having modulo sufficiently longer than the magnetic tape at a maximum possible length for the servo pattern recording apparatus to handle is used in inserting address information in the servo pattern, and an address of the address generator is reset every time a raw magnetic tape is loaded to the servo pattern recording apparatus. Further, when inserting the address information in the servo pattern, by the servo pattern in which the unique synchronization signal is inserted preceding the servo pattern in which the address information is inserted, frame synchronization of the address information can positively be carried out.

Accordingly, address information can be recorded on the servo patterns.

The servo pattern recording apparatus is constituted of a tape running apparatus to run an unrecorded magnetic tape at a constant velocity, a recording head that is in contact with the tape, and an electronic circuit to supply a current to the recording head. An operation of recording servo patterns is carried out by merely changing a recording current (current generally flows at points other than transitions) while running the magnetic tape at a constant velocity.

According to an embodiment of the present invention, there is provided a method of recording data onto a magnetic tape that includes a data band, including: obtaining a servo signal from servo patterns formed along a longitudinal direction of the magnetic tape with an interval provided between each of the servo patterns, each of the servo patterns formed across a full width of the data band; and recording, based on the obtained servo signal, data between the servo patterns while leaving a guard space between a servo pattern and recorded data.

The data recording region may be formed by recording on the magnetic tape, using a servo pattern recording head including a recording gap that has the same shape as a boundary of different magnetizations of the servo patterns, the servo patterns so that the number of transitions per servo pattern becomes one of all even or all odd.

The data recording region may be formed by erasing a part of the servo patterns recorded in advance on the magnetic tape by the servo pattern recording head including the recording gap that has the same shape as the boundary of the different magnetizations of the servo patterns, using a full-width erasing head placed downstream.

The data recording region may be formed such that each of the servo patterns is constituted of, on the data band, at least two segments arranged in a width direction of the data band, and adjacent segments are recorded with different azimuth angles.

As described above, according to the embodiments of the present invention, there can be provided a magnetic tape to/from which data can accurately be recorded/reproduced, a servo pattern recording apparatus for the magnetic tape, a magnetic tape apparatus capable of detecting deformation (expansion/contraction in width and longitudinal directions) information and tilt information of the magnetic tape, a method of producing the magnetic tape, and a recording method of the magnetic tape.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 16A and 16B each show an image of the magnetic tape, the diagrams showing two extreme frame structures in a case of inserting, for example, a 20-bit address and 128-bit management data (128 bits may be "data+error control bits");

DESCRIPTION OF PREFERRED EMBODIMENTS

Hereinafter, an embodiment of the present invention will be described with reference to the drawings.

Figure 1:
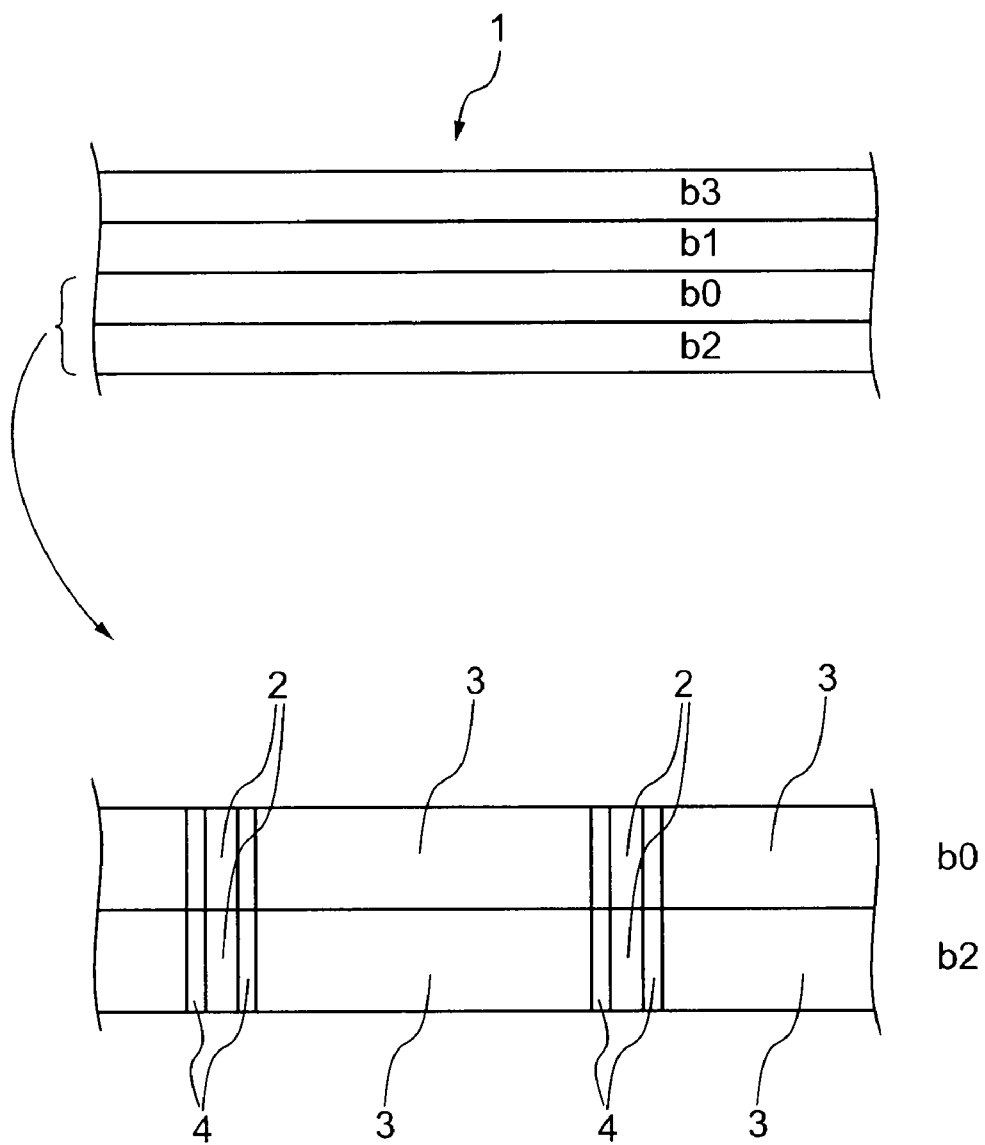
FIG. 1 is a plan view showing a magnetic tape according to an embodiment of the present invention.

FIG. 1 is a plan view showing a magnetic tape 1 according to an embodiment of the present invention. FIGS. 2A to 2D are plan views each showing an example of a servo pattern 2 of the magnetic tape 1 shown in FIG. 1. FIG. 3 shows diagrams for illustrating a principle in detecting information on a head position of a magnetic tape apparatus, deformation of the magnetic tape 1, and tilt of the magnetic tape 1.

As shown in FIG. 1, the magnetic tape 1 includes a plurality of (e.g., 4) data bands b0 to b3, servo patterns 2 formed along a longitudinal direction of the magnetic tape 1 with an interval provided between each of the servo patterns, each of the servo patterns formed across a full width of the data bands b0 to b3, a data burst 3 placed between the servo patterns 2, and a guard space 4 placed between the servo pattern 2 and the data burst 3. An integral multiple of the servo pattern 2, the data burst 3, and the guard space 4 may be handled as a physical block, for example.

The data bands b0 to b3 are regions obtained by dividing the magnetic tape 1 in a width direction, each of the data bands b0 to b3 provided along an entire length of the magnetic tape 1. The data bands b0 to b3 are each constituted of "data subband×number of channels of head of magnetic tape apparatus that records/reproduces data in parallel". Normally, the data recording/reproduction is carried out on one data band first and then the next data band.

The data subbands are regions formed along the entire length of the magnetic tape 1, each of the data subbands having a width corresponding to a channel spacing of a head H. One channel to which a multi-channel head for recording/reproducing data in parallel corresponds is a region in which a reciprocating (1 reciprocation=2 paths) scan conducted a given number of times ends while changing positions in the width direction of the magnetic tape 1 for each path. The data subband may be divided (discontinuous) in a tape width direction, e.g., separated by tape running directions.

The head channel spacing is a distance between center lines of adjacent channels of the multi-channel head H that records/reproduces data in parallel. Not all the channels have to be on the same gap line (the gap may be placed two-dimensionally or the channels may respectively be provided for a plurality of head blocks HB1, HB2, HB3, and so on that constitute the head).

The servo patterns 2 are formed across the full width of the data bands b0 to b3 (may be discontinuous) and along the longitudinal direction of the magnetic tape 1 with intervals provided therebetween. It should be noted that the servo pattern 2 of the data band b0 and the servo pattern 2 of the data band 1 may be placed with an offset in the longitudinal direction of the magnetic tape 1. The reference symbols of the data bands b0 to b3 are not limited to those assigned.

The servo pattern 2 is a combination of magnetization reversals used for controlling the position of the head H in the width direction of the magnetic tape 1 (tracking) or controlling a velocity/phase of the magnetic tape 1. The servo pattern 2 is recorded on the magnetic tape 1 in advance before shipment and is not rewritten by individual magnetic tape apparatuses. The servo patterns 2 are presumably placed at regular intervals in the longitudinal direction of the magnetic tape 1.

The data burst 3 contains partial data of a given number of paths (2× reciprocation count) in a region interposed between the servo patterns 2 on the data bands b0 to b3. Each region of the data bursts 3 has the partial data of the given number of paths (2× reciprocation count) multiplexed in the width direction of the magnetic tape 1 (multiplexed while changing track positions for each path).

The guard space 4 is a region (gap) separating the servo pattern 2 and the data burst 3 and serves to absorb fluctuations of a position of the data burst 3 in the longitudinal direction of the magnetic tape caused during data recording. The guard space 4 is necessary at all times as a format.

Figure 2A:
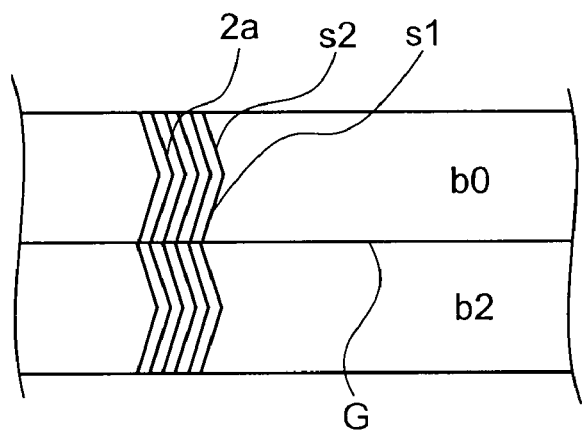
FIG. 2 are plan views each showing an example of a servo pattern of the magnetic tape shown in FIG. 1.
Figure 2B:
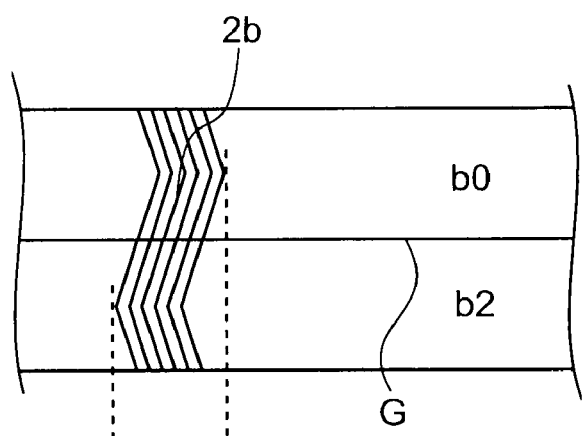
Figure 2C:
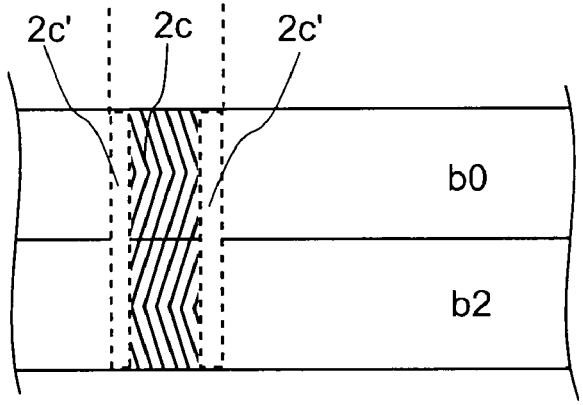
Figure 3:
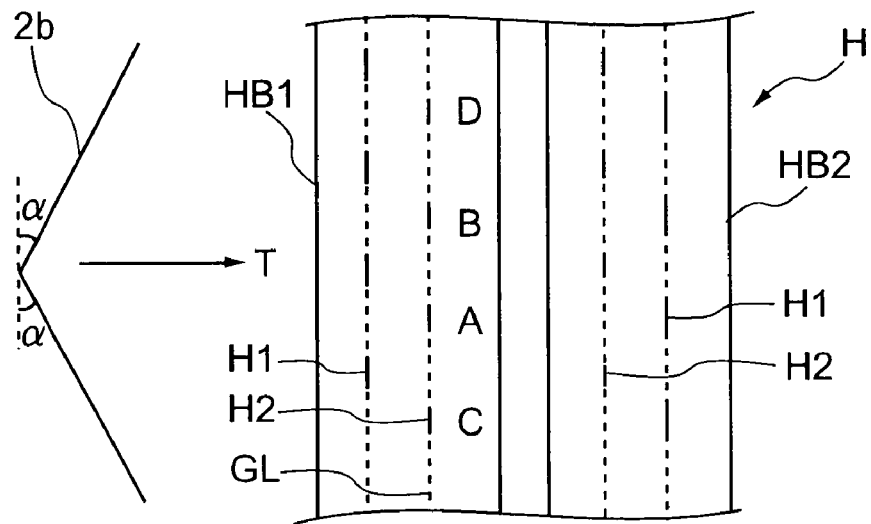
FIG. 3 shows diagrams for illustrating a principle in detecting information on a head position of a magnetic tape apparatus, deformation of the magnetic tape, and tilt of the magnetic tape.
Figure 3:
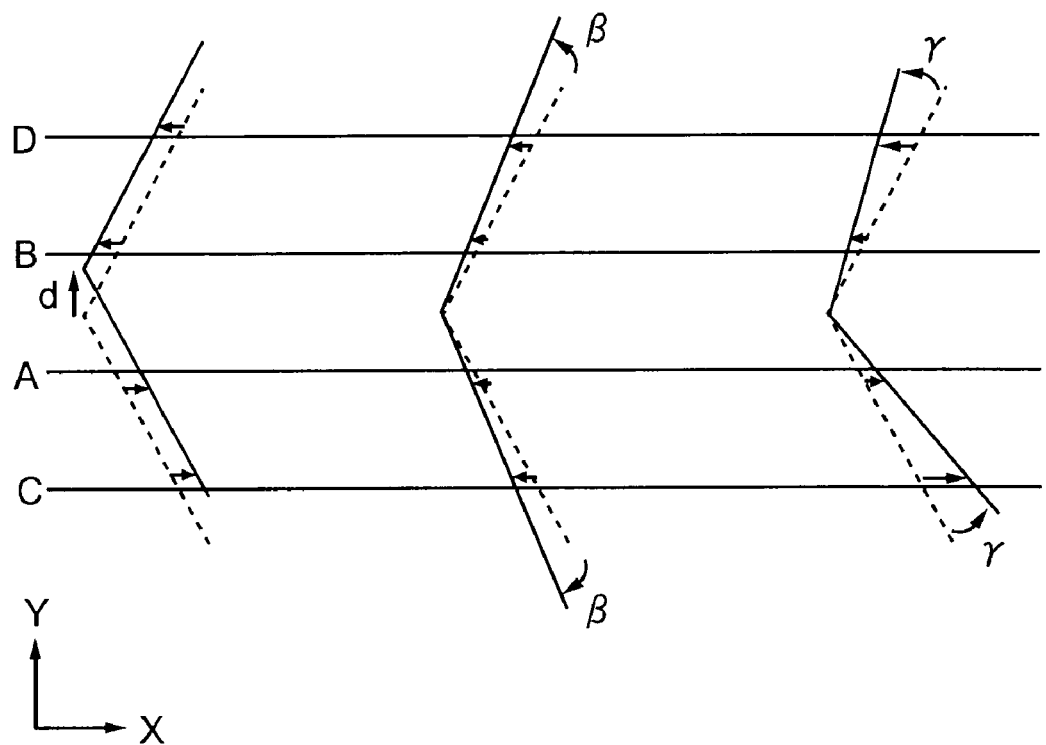

Servo patterns 2a, 2b, and 2c respectively shown in FIGS. 2A to 2C are each constituted of two segments arranged in the width direction of the data band b0. For example, the servo pattern 2a is constituted of two segments s1 and s2 formed with predetermined positive and negative azimuth angles with respect to a direction orthogonal to the running direction of the magnetic tape 1. As shown in FIG. 2A, signs of the azimuth angles of the segments s1 and s2 that form the servo pattern 2a are different from each other with a virtual boundary line G between the data band b0 and the data band b2 as a boundary, for example. As shown in FIG. 2B, for example, the signs of the azimuth angles of the segments that form the servo pattern 2b are the same on both sides of the virtual boundary line G between the data band b0 and the data band b2. A width of the segments s1 and s2 of the servo pattern 2a is substantially equal to an integral multiple of a track pitch of the data track on which data is recorded.

FIG. 2C shows an example where, after the servo pattern 2c of a predetermined length is once recorded, parts 2c' of the servo pattern 2c are deleted by a subsequent erasing head to thus form a data region.

Figure 2D:
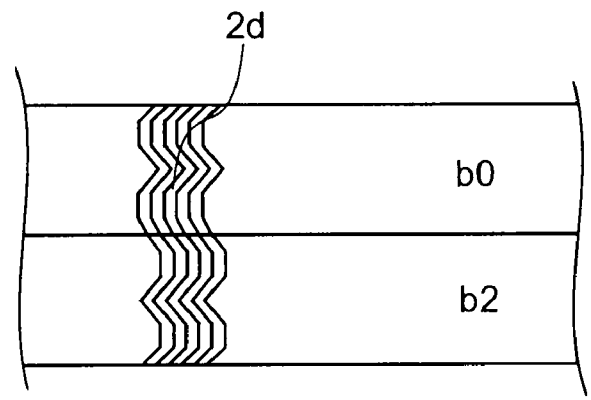

In FIG. 2D, the servo pattern 2d is constituted of 6 segments. The (recording) azimuth angles of the segments constituting the servo pattern 2d are set to have positive and negative angles having the same absolute value, and an angle of 0 degree.

In the examples above, each of the servo patterns 2a to 2d is placed continuously in the width direction of the magnetic tape 1. However, the servo pattern may be discontinuous at the boundary between the adjacent data bands b0 and b2, for example.

Next, descriptions will be given on a principle in detecting, when the servo pattern 2b is constituted of segments respectively having positive and negative azimuth angles α of the same absolute value as shown in FIG. 3, positional information (deviation amount d) of the head H of the magnetic tape apparatus in a track width direction (Y direction), deformation information (angle β) of the magnetic tape 1, and tilt information (angle γ) of the magnetic tape 1, all of which are to be described later. Assuming that channels A to D of the head H are placed on the same gap line GL, consideration will be made on a time point at which the head H of the magnetic tape apparatus outputs a signal in reaction to the magnetization reversal of the servo pattern 2b.

A single two-bump-type head H is obtained by inversely attaching the two head blocks HB1 and HB2 in each of which a reproducing head H2 is piggybacked on a recording head H1 (or vise versa). The recording head H1 and the reproducing head H2 are provided to (a first bump (upstream bump) constituting) the head block HB1 in the stated order, and the reproducing head H2 and the recording head H1 are provided to (a second bump (downstream bump) constituting) the head block HB2 in the stated order (alternatively, the order in which the recording and reproducing heads are provided in each of the head blocks may be reversed). The recording head H1 of the first bump is aligned in track with the reproducing head H2 of the second bump, and the reproducing head H2 of the first bump is aligned in track with the recording head H1 of the second bump.

As shown in FIG. 3, when the magnetic tape 1 is raised a length d by an LTM (motion of the running magnetic tape 1 in the width direction) (head H is relatively lowered), phases of outputs of the channels A and C are advanced by the same amount (output time point is advanced), and phases of outputs of the channels B and D are delayed by the same amount (output time point is delayed).

The LTM is an abbreviation of lateral tape motion and refers to a motion of the magnetic tape 1 in the width direction that is caused during running of the magnetic tape 1. The LTM becomes a limiting factor of tracking of narrow-pitch tracks (i.e., narrow tracks). By reproducing the servo pattern 2b to detect a relative position of the head H and the magnetic tape 1 and tracking the LTM, the head H is controlled to be positioned at as correct a track position as possible (tracking servo).

When the magnetic tape 1 is deformed (the width of the magnetic tape 1 is expanded (an angle of positive and negative segments is increased by an angle 2β) and the length thereof is shortened), the phases of the outputs of all the channels A to D are delayed, but a delay amount of the channels A and B is small whereas that of the channels C and D is large.

When the magnetic tape 1 is run while being tilted by an angle γ with respect to the Y direction, the phases of the outputs of the channels A and C are advanced but those of the channels B and D are delayed. The phase change direction of the channels A to D change is the same as in the case of the LTM. However, the change amount of the channels A and B is small whereas that of the channels C and D is large. The change amounts are expressed by a direction and length of an arrow in FIG. 3. As described above, influences of the LTM, the deformation of the magnetic tape 1, and the tilt of the running of the magnetic tape 1 are all different. However, even when mixed, complete separation is possible as follows.

Figure 4:
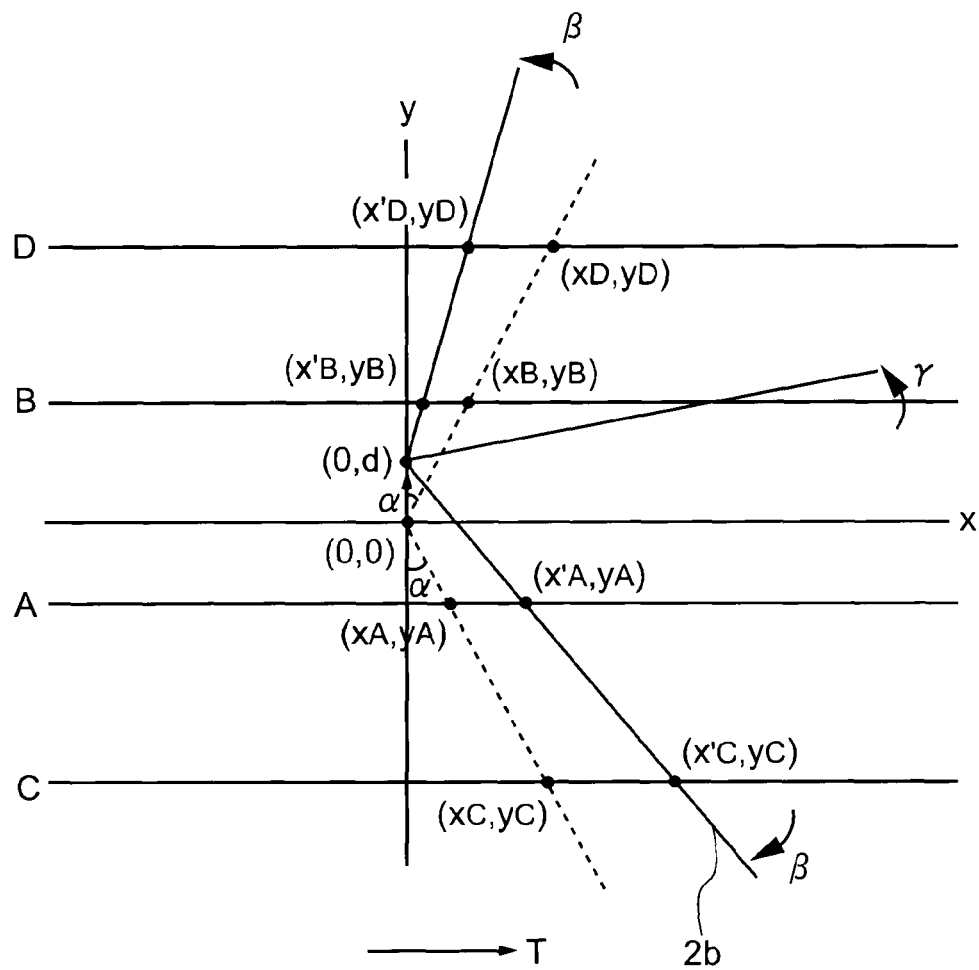
FIG. 4 is a diagram for illustrating the principle in detecting the information on the head position of the magnetic tape apparatus, deformation of the magnetic tape, and tilt of the magnetic tape.

FIG. 4 is a diagram for illustrating the principle in detecting the information on the head position of the magnetic tape apparatus, deformation of the magnetic tape 1, and tilt of the magnetic tape 1.

Shown is a case where, on the magnetic tape 1 including the servo pattern 2b, a shift d caused by the LTM (motion of the running magnetic tape 1 in the width direction) (positional information), an azimuth-angle change of +β due to the deformation (deformation information), and a tilt γ (tilt information) occur compositely. The shift d serves as the positioning information of the head H (or the magnetic tape 1). As shown in FIG. 4, intersections of the channels A to D with the servo pattern 2b in a normal state indicated by a broken line are respectively represented by (xA, yA), (xB, yB), (xC, yC), and (xD, yD), and intersections of the channels A to D with the servo pattern 2b affected by the shift, deformation, and tilt, which is indicated by a solid line, are respectively represented by (x'A, yA), (x'B, yB), (x'C, yC), and (x'D, yD). Moreover, coordinates of an apex of the servo pattern 2b in the normal state are represented by (0, 0), an apex angle by (π−2α), that is, azimuth angles of +α, and the shift amount by d. Among the unknown quantities (d, γ, β), d can be obtained as follows, for example.

[Expression 1]

$$\tan\alpha = -\frac{x_A}{y_A} = \frac{x_B}{y_B} = -\frac{x_C}{y_C} = \frac{x_D}{y_D} = K_0 : \text{Known value}$$

$d$: Shift  
$\beta$: Widening angle (magnetic tape deformation) $\Big\}$ Unknown quantity  
$\gamma$: Tilt (tilt of magnetic tape)

$$\tan(\alpha - \beta + \gamma) = -\frac{x'_A}{y_A - d} = -\frac{x'_C - x'_A}{y_C - y_A} = K_1$$

$$\tan(\alpha - \beta - \gamma) = \frac{x'_B}{y_B - d} = \frac{x'_D - x'_B}{y_D - y_B} = K_2$$

Thus $$x'_A = K_1(d - y_A)$$

$$x'_B = K_2(y_B - d)$$

$$\therefore d = \frac{K_1 y_A + K_2 y_B + (x'_A - x'_B)}{K_1 + K_2}$$

Incidentally, $$x'A - x'B = V^* t'AB = V(t'B - t'A)$$

$$x'C - x'A = V^* t'CA = V(t'A - t'C)$$

$$x'D - x'B = V^* t'DB = V(t'B - t'D)$$

Here,
V: magnetic tape velocity
t'AB, t'CA, t'DB: lapse time between detector outputs
t'A, t'B, t'C, t'D: output time of detector of channels A to D
yA, yB, yC, yD: position of channels (head H) A to D in magnetic tape width direction (known reference value predetermined for each reproducing channel combination: channel information (coordinate information))

Here, the positions yA, yB, yC, and yD of the channels A to D, respectively, in the y-axis direction, and the azimuth angle α are known. Further, the distance between the points (x'A, yA) and (x'B, yB) in the x-axis direction is obtained by multiplying the lapse time or time difference between the outputs of the corresponding channels A and B (measured value in either case): t'B−t'A by the magnetic tape velocity V.

In other words, as a result of calculating K1 and K2 based on the known values and the measured values, d is obtained.

It should be noted that in this case, the denominator and numerator of the expression used for calculating d are both a coefficient multiple of V, and d can be obtained based on y and t irrespective of V. β and γ can also be obtained.

Figure 5:
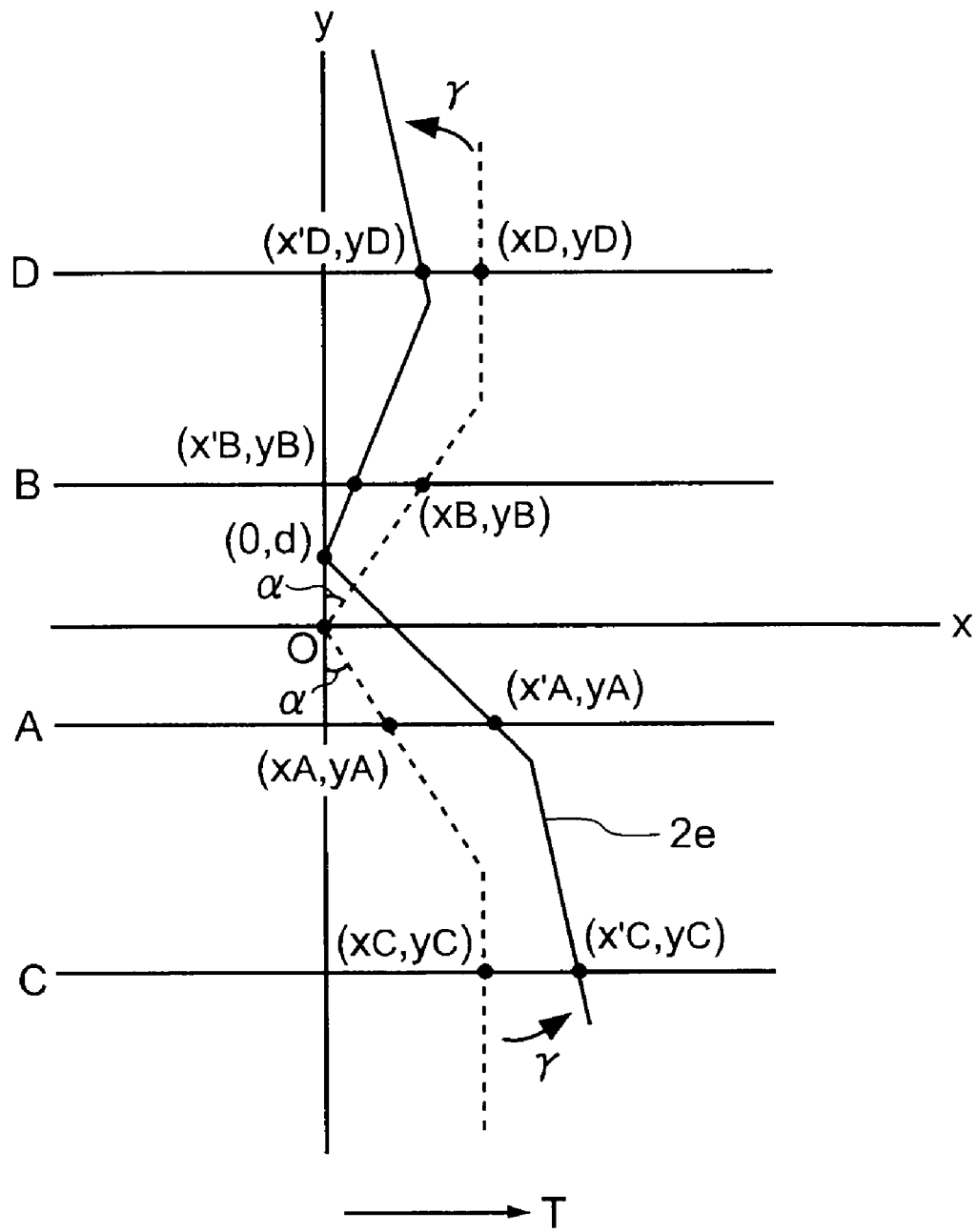
FIG. 5 is a diagram for illustrating the principle in detecting the information on the head position of the magnetic tape apparatus, deformation of the magnetic tape, and tilt of the magnetic tape.

Next, a case where, on the magnetic tape 1 including a servo pattern 2e, the shift d caused by the LTM, the azimuth-angle change of ±β due to the deformation, and the tilt γ occur compositely is shown. The servo pattern 2e shown in FIG. 5 is constituted of segments having positive/negative azimuth angles ±α of the same absolute value and two segments having a 0-degree azimuth angle. Descriptions will now be given on a principle in detecting the positional information of the head H in the track width direction (shift d) and the tilt information of the magnetic tape 1 (angle γ) at this time (β=0).

FIG. 5 is a diagram for illustrating the principle in detecting the information on the head position, deformation of the magnetic tape, and tilt of the magnetic tape.

Consideration will be made on a time point at which, when assuming that the channels A to D of the head H are placed on the same gap line GL as shown in FIG. 5, the head H of the magnetic tape apparatus outputs a signal in reaction to the magnetization reversal of the servo pattern 2e.

FIG. 5 shows a case where the magnetic tape 1 including the servo pattern 2e is raised by the LTM (head H is lowered relatively: shift d) and the magnetic tape 1 is run with a tilt (angle γ). In this case, the phases of the outputs of the channels A and C are advanced (output time point is advanced), and the phases of the outputs of the channels B and D are delayed (output time point is delayed).

The shift d and the tilt angle γ can be calculated as follows.

[Expression 2]

$$\tan\alpha = -\frac{x_A}{y_A} = \frac{x_B}{y_B} = -\frac{x_C}{y_C} = \frac{x_D}{y_D} = K_0 : \text{Known value}$$

$d$: Shift  
$\gamma$: Tilt (tilt of magnetic tape) $\Big\}$ Unknown value $\beta(=0)$: Widening angle (magnetic tape deformation)

$$\tan\gamma = -\frac{x'_C - x'_D}{y_C - y_D} = K_3$$

$$\tan(\alpha + \gamma) = -\frac{x'_A}{y_A - d}$$

$$\tan(\alpha - \gamma) = \frac{x'_B}{y_B - d}$$

$$\tan(\alpha \pm \gamma) = \frac{\tan\alpha \pm \tan\gamma}{1 \mp \tan\alpha\tan\gamma} = \frac{K_0 \pm K_3}{1 \mp K_0 K_3}$$

$$(d - y_A)\tan(\alpha + \gamma) = x'_A$$

$$(y_B - d)\tan(\alpha - \gamma) = x'_B$$

$$x'_A - x'_B = d(\tan(\alpha + \gamma) + \tan(\alpha - \gamma)) - (y_A \tan(\alpha + \gamma) + y_B \tan(\alpha - \gamma))$$

$$\therefore d = \frac{x'_A - x'_B}{\tan(\alpha + \gamma) + \tan(\alpha - \gamma)} + \frac{y_A \tan(\alpha + \gamma) + y_B \tan(\alpha - \gamma)}{\tan(\alpha + \gamma) + \tan(\alpha - \gamma)}$$

When the magnetic tape 1 is run with a tilt (angle γ) (β=0 assumed), the tilt angle γ can be directly calculated from a difference between the output phases of the channels C and D using tan γ=V(t'C−t'D)/(yD−yC).

Further, disregarding the phase difference between the channels C and D (i.e., calculating the shift d as the positional information of the head H based only on the phase difference between the channels A and B) means that the tilt of the magnetic tape 1 is also disregarded (γ=0).

Next, a case where, on the magnetic tape 1 including the servo pattern 2d, the shift d caused by the LTM, the azimuth-angle change of ±β due to the deformation, and the tilt γ occur compositely is shown. Descriptions will now be given on a principle in detecting, when the servo pattern 2d is constituted of segments having positive/negative azimuth angles of the same absolute value, two segments having a 0-degree azimuth angle, and different segments having positive/negative azimuth angles of the same absolute value, the positional information of the head H in the track width direction (shift d), information on the width of the magnetic tape 1 (angle β), and the tilt information of the magnetic tape 1 (angle γ).

Figure 6:
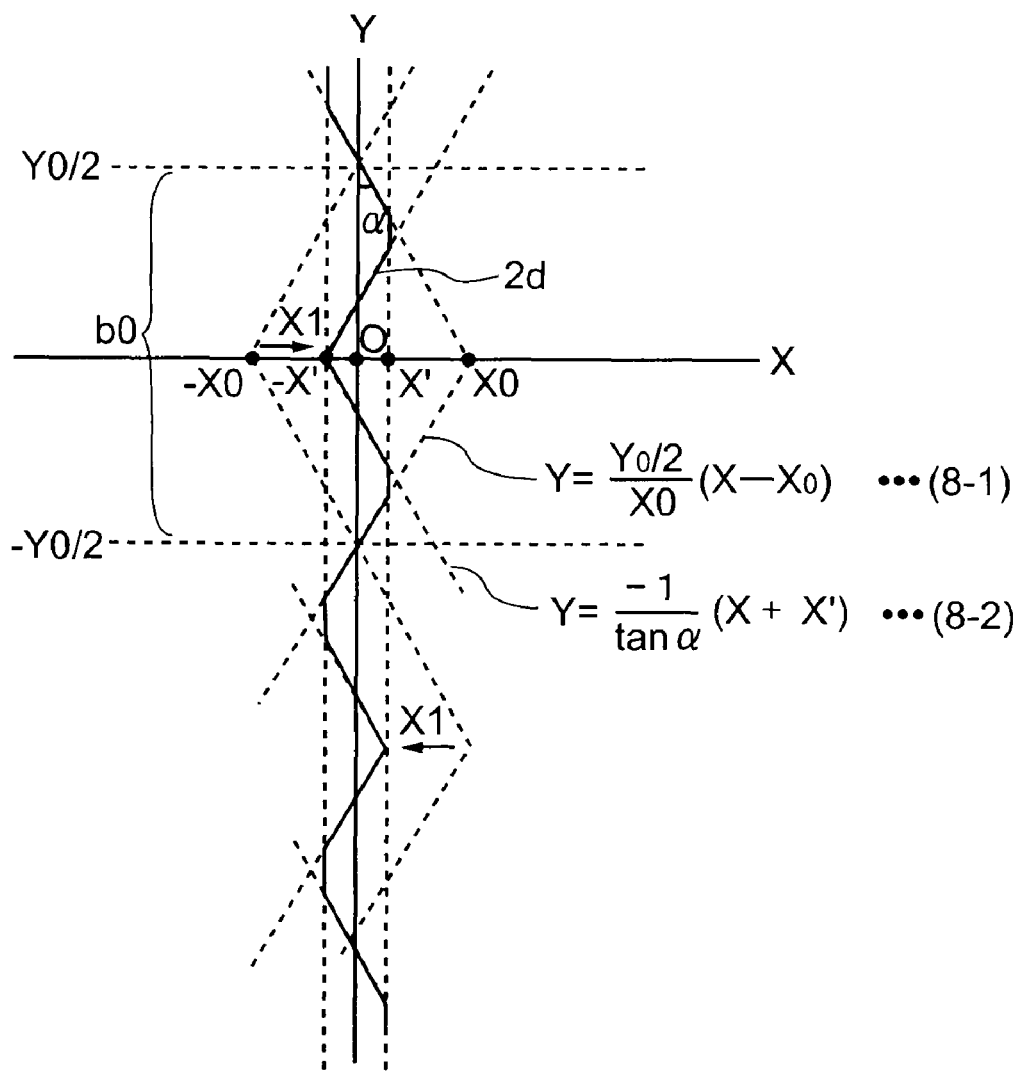
FIG. 6 is a diagram for illustrating a structural example of a servo pattern (2d)
Figure 7:
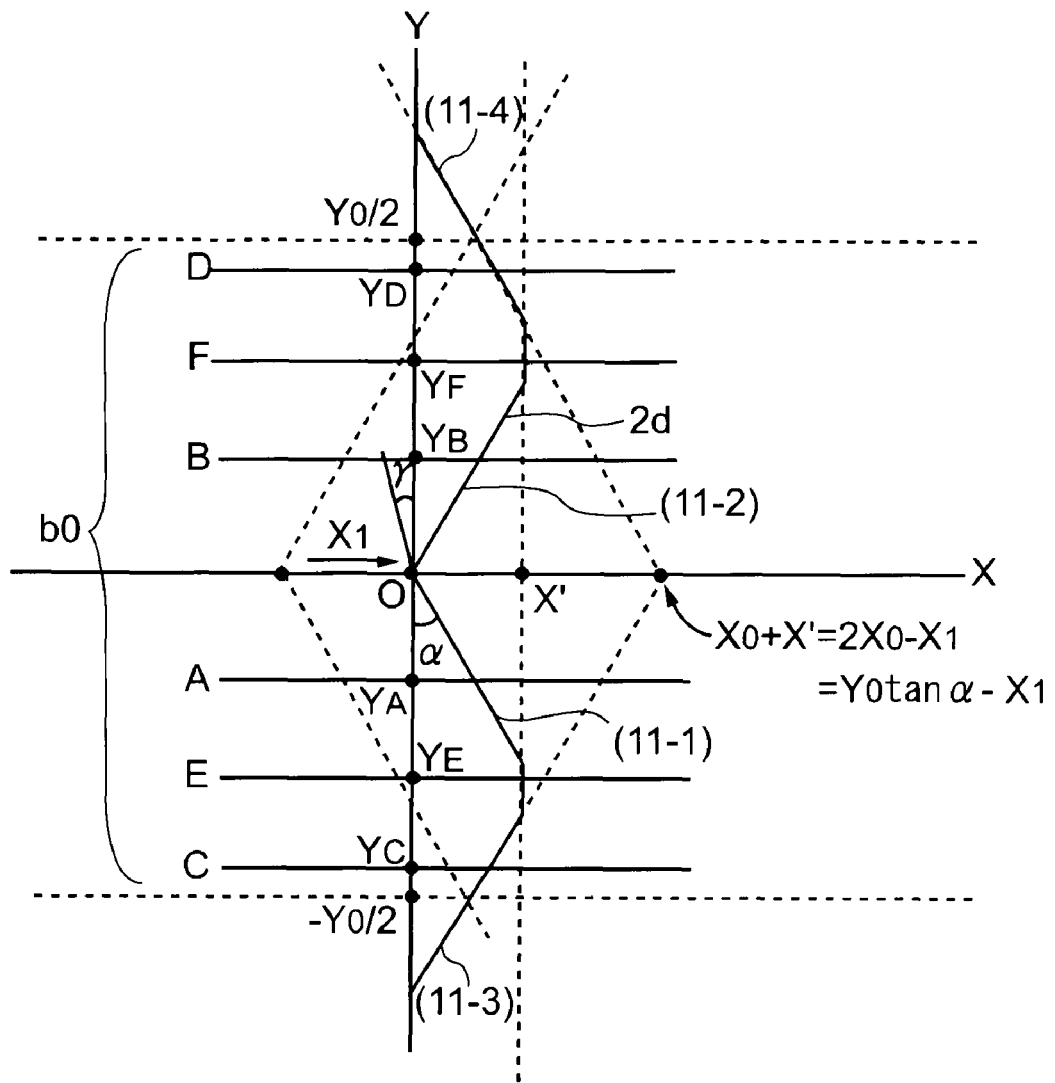
FIG. 7 is a diagram for illustrating the principle in detecting the information on the head position of the magnetic tape apparatus, deformation of the magnetic tape, and tilt of the magnetic tape.

FIGS. 6 and 7 are diagrams for respectively illustrating the structure of the servo pattern 2d and the principle in detecting the information on the head position, deformation of the magnetic tape, and tilt of the magnetic tape.

Consideration will be made on points in time at which, when assuming that the channels A to F of the head H of the magnetic tape apparatus are placed on the same gap line as shown in the figures and positions YA, YB, YC, YD, YE, and YF of the channels A to F, respectively, in the y-axis direction and the azimuth angle α are known, the head H outputs a signal in reaction to the magnetization reversal of the servo pattern 2d.

Next, a calculation expression for calculating the shift of the magnetic tape will be described.

Expressions (8-1) and (8-2) shown in FIG. 6 can be modified as follows.

[Expression 3]

$Y_0$: Data band pitch
α: Azimuth angle $$\frac{Y_0}{2}\tan\alpha = X_0$$

$$X_0 - X_1 = X'$$

$$Y = \frac{Y_0/2}{X_0}(X - X_0) \quad (8\text{-}1)$$

$$Y = \frac{Y_0}{2X_0}(X - X_0)$$

$$Y = \frac{1}{\tan\alpha}(X - X_0)$$

$$\therefore Y = \frac{1}{\tan\alpha}X - \frac{Y_0}{2}$$

$$Y = \frac{-1}{\tan\alpha}(X + X') \quad (8\text{-}2)$$

$$X' = X_0 - X_1$$

$$Y = \frac{-1}{\tan\alpha}(X + X_0 - X_1)$$

$$\therefore Y = \frac{-1}{\tan\alpha}X - \frac{Y_0}{2} + \frac{X_1}{\tan\alpha}$$

As shown in FIG. 7, the original point is shifted from that shown in FIG. 6 by X' in the −X direction (i.e., XNEW=X+ X').

Setting is made as follows.
Y0: data band pitch
α: azimuth angle (Y0 tan α=2X0)
X1: shift amount for determining servo pattern At this time, parts of the servo pattern shown in FIG. 7 are respectively expressed by Expressions (11-1), (11-2), (11-3), and (11-4) below.

[Expression 4]

$$\begin{cases} Y = \frac{-1}{\tan\alpha}X & (11\text{-}1) \\ Y = \frac{1}{\tan\alpha}X & (11\text{-}2) \\ Y = \frac{1}{\tan\alpha}[X - (2X_0 - X_1)] & (11\text{-}3) \\ Y = \frac{-1}{\tan\alpha}[X - (2X_0 - X_1)] & (11\text{-}4) \end{cases}$$

When the azimuth angle α is substituted by α−β in consideration of the angle β (widening angle of the magnetic tape in the width direction), Expressions (11-1'), (11-2'), (11-3'), and (11-4') below can be obtained.

[Expression 5]

$$\begin{cases} Y = \frac{-1}{\tan(\alpha - \beta)}X & (11\text{-}1') \\ Y = \frac{1}{\tan(\alpha - \beta)}X & (11\text{-}2') \\ Y = \frac{1}{\tan(\alpha - \beta)}[X - (2X_0 - X_1)] & (11\text{-}3') \\ Y = \frac{-1}{\tan(\alpha - \beta)}[X - 2(X_0 - X_1)] & (11\text{-}4') \end{cases}$$

When taking the angle γ (tilt angle during running of the magnetic tape) into consideration, Expressions (12-1) and (12-2) below can be obtained.

[Expression 6]

$$Y = \frac{-1}{\tan(\alpha - \beta + \gamma)}X \quad (12\text{-}1)$$

$$Y = \frac{1}{\tan(\alpha - \beta - \gamma)}X \quad (12\text{-}2)$$

Further, the point (X″, 0) moves to (X‴, Y‴), and Expressions (12-1) and (12-2) become Expressions (12-3) and (12-4), respectively, provided that X″=2X0−X1 and 2X0=Y0 tan α.

[Expression 7]

$$\begin{pmatrix} X''' \\ Y''' \end{pmatrix} = \begin{pmatrix} \cos\gamma & -\sin\gamma \\ \sin\gamma & \cos\gamma \end{pmatrix}\begin{pmatrix} X'' \\ 0 \end{pmatrix}$$

$$X''' = X''\cos\gamma = (Y_0\tan\alpha - X_1)\cos\gamma$$
$$Y''' = X''\sin\gamma = (Y_0\tan\alpha - X_1)\sin\gamma$$

$$Y - Y''' = \frac{1}{\tan(\alpha - \beta - \gamma)}(X - X''') \quad (12\text{-}3)$$

$$Y - Y''' = \frac{-1}{\tan(\alpha - \beta + \gamma)}(X - X''') \quad (12\text{-}4)$$

Taking into consideration the shift d based on Expressions (12-1) to (12-4), Expressions (13-1) to (13-4) below can be obtained.

[Expression 8]

$$\begin{cases} Y - d = \frac{-1}{\tan(\alpha - \beta + \gamma)}X & (13\text{-}1) \\ Y - d = \frac{1}{\tan(\alpha - \beta - \gamma)}X & (13\text{-}2) \\ Y - Y''' - d = \frac{1}{\tan(\alpha - \beta - \gamma)}(X - X''') & (13\text{-}3) \\ Y - Y''' - d = \frac{-1}{\tan(\alpha - \beta + \gamma)}(X - X''') & (13\text{-}4) \end{cases}$$

Here, assuming that the positions of the channels A to D of the head H in the Y direction are YA, YB, YC, and YD, respectively, Expressions (13-1') to (13-4') below can be obtained. Expressions (13-5') and (13-6') can be obtained from those expressions.

[Expression 9]

$$\begin{cases} Y_A - d = \dfrac{-1}{\tan(\alpha - \beta + \gamma)} X_A & (13\text{-}1') \\ Y_B - d = \dfrac{1}{\tan(\alpha - \beta - \gamma)} X_B & (13\text{-}2') \\ Y_C - Y''' - d = \dfrac{1}{\tan(\alpha - \beta - \gamma)} (X_C - X''') & (13\text{-}3') \\ Y_D - Y''' - d = \dfrac{-1}{\tan(\alpha - \beta + \gamma)} (X_D - X''') & (13\text{-}4') \end{cases}$$

$$\tan(\alpha - \beta + \gamma) = \frac{-X_A}{Y_A - d} \quad (13\text{-}5')$$
$$= \frac{-X_D + X'''}{Y_D - d - Y'''}$$
$$= \frac{-(X_A - X_D) - X'''}{Y_A - Y_D + Y'''}$$
$$= K_1$$

$$\tan(\alpha - \beta - \gamma) = \frac{X_B}{Y_B - d} \quad (13\text{-}6')$$
$$= \frac{X_C - X'''}{Y_C - d - Y'''}$$
$$= \frac{X_B - X_C + X'''}{Y_B - Y_C + Y'''}$$
$$= K_2$$

Expression (13-7) below for calculating the shift d can be obtained from those expressions.

[Expression 10]

$$X_A = K_1(d - Y_A)$$
$$X_B = K_2(Y_B - d)$$
$$\therefore d = \frac{K_1 Y_A + K_2 Y_B + (X_A - X_B)}{K_1 + K_2} \quad (13\text{-}7)$$

Here, YA and YB are known, and XA−XB is obtained based on the measured values (time difference between the outputs of the channels A and B). Therefore, if K1 and K2 can be obtained from Expressions (13-5') and (13-6'), the shift d can be obtained using Expression (13-7).

Although Expression (13-7) can be obtained by calculating the shift d based on the lapse time or time difference between the outputs of the channels A to D, the tilt angle γ is unknown. In this regard, if the tilt angle γ is obtained based on the time difference between the outputs of the channels E and F, the shift d can be obtained. It should be noted that the length X1 in the X-axis direction (part of the format of the servo pattern) used in this process needs to be corrected with the deformation of the magnetic tape in the longitudinal direction, using the magnetic tape velocity obtained at the time of measurement of the servo pattern. The deformation of the magnetic tape in the longitudinal direction leads to a deviation in the magnetic tape velocity.

Incidentally, $$X''' = X'' \cos \gamma$$

$$Y''' = X' \sin \gamma$$

$$X'' = Y0 \text{*tan } \alpha - X1$$

Meanwhile, $$\tan \gamma = (XE - XF)/(YF - YE)$$

$$\gamma = \tan^{-1}[(XE - XF)/(YF - YE)] \quad (13\text{-}8)$$

Here, YF and YE are known, and XE−XF can be obtained from the measured values. By substituting the values into Expressions (13-5') and (13-6'), as expressed by Expressions (14-1) and (14-2) below, K1 and K2 can be expressed by known values or values obtained from the measurement.

[Expression 11]

$$K_1 = \frac{-(X_A - X_D) - (Y_0 \tan \alpha - X_1)}{(Y_A - Y_D) + (Y_0 \tan \alpha - X_1)} \cdot \frac{\cos\left(\tan^{-1} \dfrac{X_E - X_F}{Y_F - Y_E}\right)}{\sin\left(\tan^{-1} \dfrac{X_E - X_F}{Y_F - Y_E}\right)} \quad (14\text{-}1)$$

$$K_2 = \frac{(X_B - X_C) + (Y_0 \tan \alpha - X_1)}{(Y_B - Y_C) + (Y_0 \tan \alpha - X_1)} \cdot \frac{\cos\left(\tan^{-1} \dfrac{X_E - X_F}{Y_F - Y_E}\right)}{\sin\left(\tan^{-1} \dfrac{X_E - X_F}{Y_F - Y_E}\right)} \quad (14\text{-}2)$$

Therefore, it is possible to obtain the shift d by substituting Expressions (14-1) and (14-2) into Expression (13-7). For example, it is also possible to calculate the angle β using Expression (13-5') and the like.

(Detection of Magnetic Tape Velocity)

The cycle of the servo pattern is basically measured by the magnetic tape apparatus. When the servo pattern includes a segment having a 0-degree azimuth angle, like the servo pattern 2d shown in FIGS. 6 and 7, simply, a cycle from the first transition of the segment to the first transition of the next servo pattern in the longitudinal direction of the magnetic tape only needs to be measured, for example.

Meanwhile, when the servo pattern does not include a segment having a 0-degree azimuth angle like the servo pattern 2b shown in FIG. 4, by obtaining the magnetic tape velocity from an average of the cycles measured between, for example, the first transition of the segment having a positive azimuth angle and that of the segment having a negative azimuth angle (e.g., channels A and B), the influence of the fluctuation of the LTM (fluctuation of shift d) can be suppressed. It should be noted that a method of measuring and averaging the cycles of the segments placed above and below the center of the data band can also be used in the case of the segment having the 0-degree azimuth angle. In this case, the influence of the tilt of the magnetic tape can be suppressed.

Thus, according to this embodiment, each of the plurality of data bands b0 to b3 arranged in the width direction of the magnetic tape 1 is provided with, in the stated order, the servo pattern 2, the guard space 4, the data burst 3, the guard space 4, the servo patterns 2, the guard space 4, the data burst 3, and so on.

For recording data in the data burst 3, under the presupposition that the servo patterns 2 are recorded in advance, the reproducing head H2 located on the same bump as the recording head H1 of the upstream bump usually reproduces the plurality of servo patterns 2 (no recording current is supplied at this time) first at the start of the recording to thus control the position of the head H. After that, a recording current is supplied to the upstream recording head H1 so as to record data, and the supply of the recording current is stopped after a certain lapse time (right before next servo pattern). Then, the next servo pattern 2 is reproduced by the same reproducing head H2 of the same bump to thus detect the positional information of the head, and recording to the data burst is carried out again immediately thereafter. Hereinafter, the recording/reproduction and the head position control are repeated until the recording is completed. During the recording, the reproducing head H2 located on the downstream bump is used to carry out read-after-write (or read-while-write).

Specifically, while the position of the recording data track is deviated due to the tilt of the running direction of the magnetic tape 1 when using the recording head H1 and the reproducing head H2 located respectively on (different) upstream and downstream bumps, because the recording head H1 and the reproducing head H2 located on the same upstream bump are alternately used time-divisionally in the embodiment of the present invention, the reproducing head H2 that is closer to the recording head H1 can be used to reproduce the servo pattern 2 to thus control with higher accuracy the position of the head H based on accurate servo information. As a result, the head H can be led to an optimal position, and data can thus be recorded at a correct position. Moreover, the problem of crosstalk from the recording head H1 to the reproducing head H2 during recording can be suppressed.

Figure 8:
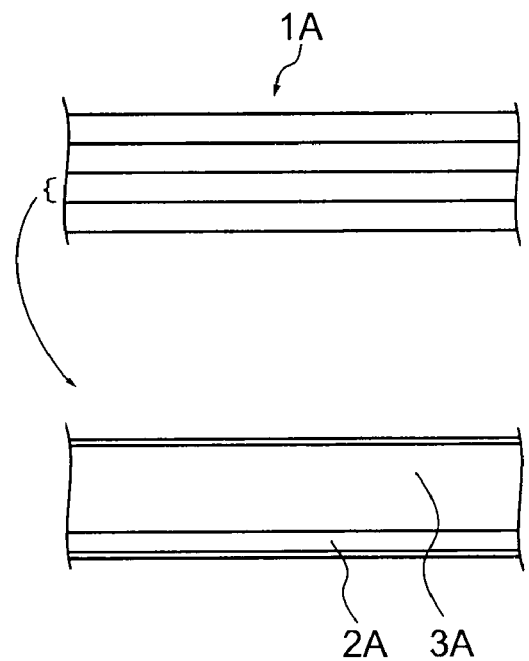
FIG. 8 shows partial plan views of a head of a magnetic tape apparatus of the related art and a magnetic tape of the related art.
Figure 8:
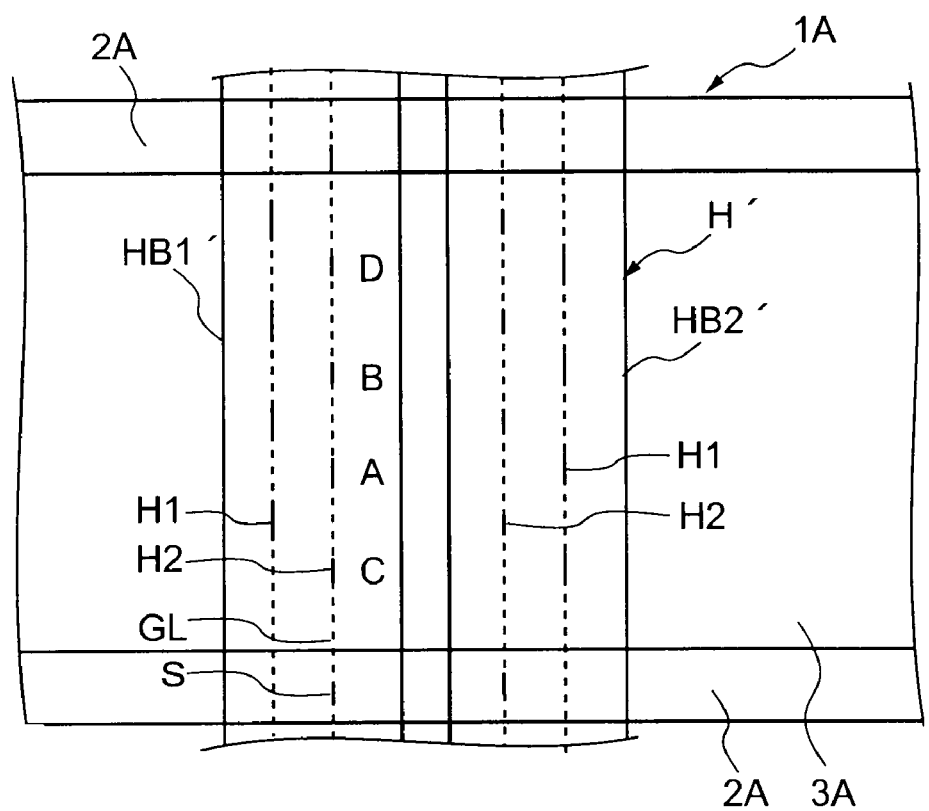

FIG. 8 shows partial plan views showing a head of a magnetic tape apparatus of the related art and a magnetic tape of the related art.

Specifically, in the related art, a single two-bump-type head H' is obtained by, as shown in FIG. 8, inversely attaching two head blocks HB1' and HB2' in each of which the reproducing head H2 is piggybacked on the recording head H1 (or vise versa). A first bump (upstream bump) constituting the head block HB1' is provided with the recording head H1 and the reproducing head H2 in the stated order, and a second bump (downstream bump) constituting the head block HB2' is provided with the reproducing head H2 and the recording head H1 in the stated order (or vise versa). Thus, the recording head H1 of the first bump is aligned in track position with the reproducing head H2 of the second bump, and the reproducing head H2 of the first bump is aligned in track position with the recording head H1 of the second bump. Servo gaps are formed on the reproducing gap.

By thus distancing the recording gap (upstream) and the reproducing gap (downstream) by about 1 mm, crosstalk from the recording head H1 to the reproducing head H2 is suppressed.

As shown in FIG. 8, in the related art, a magnetic tape 1A is divided into multiple pieces (e.g., four) in the width direction, and a data band 3A and a servo pattern 2A arranged in the width direction of the magnetic tape 1A are provided to each of the divided sections. During recording, although the reproducing head H2 located on the same bump as the recording head H1 corresponds to a servo channel S placed on the outer side of the data channel, the reproducing head H2 cannot be used for reproduction of a servo signal due to the crosstalk from the recording head H1. Therefore, the servo signal is detected by the servo channel of the reproducing head H2 of the adjacent bump placed downstream in the running direction of the magnetic tape 1A so that the position of the recording head is controlled. When the running of the magnetic tape 1A is tilted in this state, the position of the recording head H1 is deviated that much from the correct position, resulting in a limitation of a track density. In a normal method, a gap line of the head block HB1' and a gap line of the head block HB2' are required to be brought closer to each other for suppressing an influence of the tilt of the running of the magnetic tape 1A. However, due to the restrictions of crosstalk and the like, it is difficult to reduce the distance between the gap lines.

Figure 9:
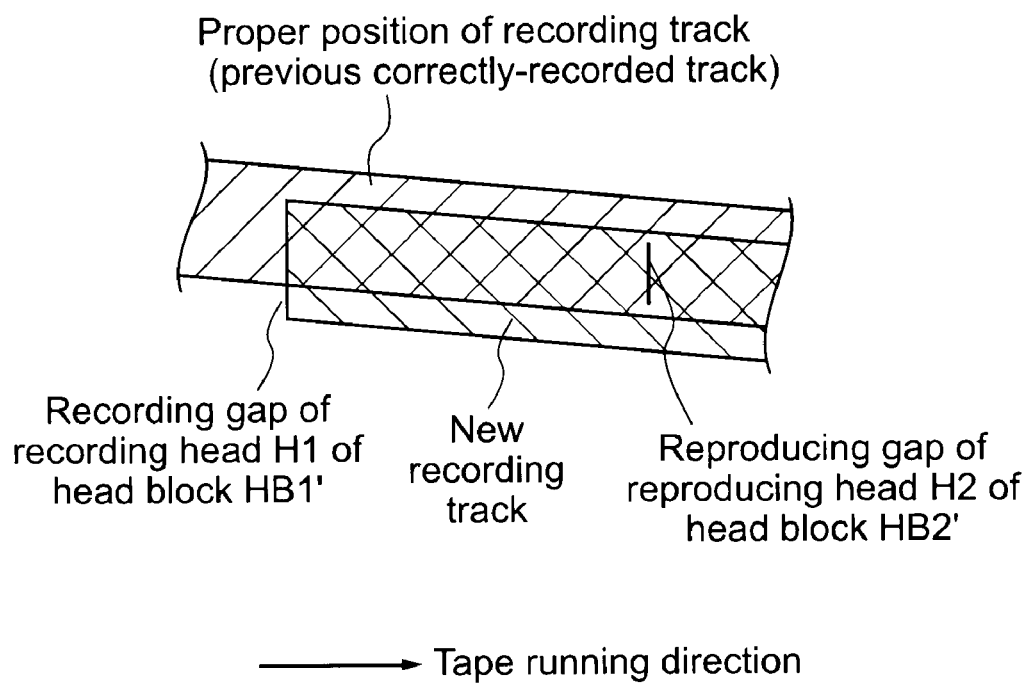
FIG. 9 is a diagram for illustrating a deviation of a recording track caused by a tilt of running of the magnetic tape of the related art.

Specifically, the tracking operation involves constantly positioning the reproducing gap at a track center as a reference. Therefore, when a direction in which the tape runs on a front surface side of the head (tilt) changes dynamically (tape meandering) as shown in FIG. 9, the position of the recording gap is caused of a track deviation (track misregistration) by an amount corresponding to a tangent of a tilt angle and a distance between the gaps (in the longitudinal direction). In other words, due to an offset of the position of the recording track, because the adjacent track that is already recorded is partially overwritten and a track width thereof is narrowed, a tracking margin is cut.

In this embodiment, because the recording head H1 and the reproducing head H2 located on the same upstream bump are alternately used time-divisionally as shown in FIG. 3, the reproducing head H2 closer to the recording head H1 can be used to reproduce the servo pattern 2 and thus control with higher accuracy the position of the head H based on accurate servo information. As a result, the head H can be led to an optimal position, and data can thus be recorded at the correct position. Moreover, the problem of crosstalk from the recording head H1 to the reproducing head H2 during recording can be suppressed.

During reproduction, the reproducing head H2 used for data reproduction (usually downstream bump) also reproduces the servo pattern 2 to control the position of the head H.

When the shift d caused by the LTM (motion of running magnetic tape 1 in width direction), the azimuth-angle change of $\pm\beta$ due to the deformation, and the tilt angle $\gamma$ are caused compositely in the magnetic tape 1 including the servo pattern 2*b*, as shown in FIG. 5, K1 and K2 can be obtained based on the known values and the measured values, and the shift d, the angle $\beta$, and the tilt angle $\gamma$ can consequently be obtained (the positioning information of the recording head H1 or the reproducing head H2 in the track width direction (shift d) can be corrected (obtained) using the deformation information (angle $\beta$) and/or tilt information (angle $\gamma$) of the magnetic tape 1). Consequently, data can be accurately recorded/reproduced by an adjustment of the position of the head H.

When the shift d caused by the LTM and the tilt angle $\gamma$ are caused compositely in the magnetic tape 1 including the servo pattern 2*e*, it is possible to obtain the tilt angle $\gamma$ directly from the phase difference between the outputs of the channels C and D, and obtain the shift d from the expressions shown in [Expression 2]. Consequently, data can be accurately recorded/reproduced by the adjustment of the position of the head H.

When the shift d caused by the LTM, the azimuth-angle change of $\pm\beta$ due to the deformation, and the tilt angle $\gamma$ are caused compositely in the magnetic tape 1 including the servo pattern 2*d*, it is possible to obtain the shift d using Expression (13-7) and $\gamma$ using Expression (13-8). Consequently, data can be accurately recorded/reproduced by the adjustment of the position of the head H.

By recording/reproducing data to/from the magnetic tape 1 including the servo pattern 2 using the linear magnetic tape apparatus equipped with the multi-channel head H, in addition to the usually-obtained positional information of the magnetic tape 1 in the width direction, positioning information corresponding to the deviation that is due to the deformation of the magnetic tape 1 or the tilt of the head H can also be detected, thus significantly enhancing the track density (TPI).

Heretofore, the track pitch has been narrow without limit. Hereinafter, an example of the magnetic tape will be described.

Figure 10:
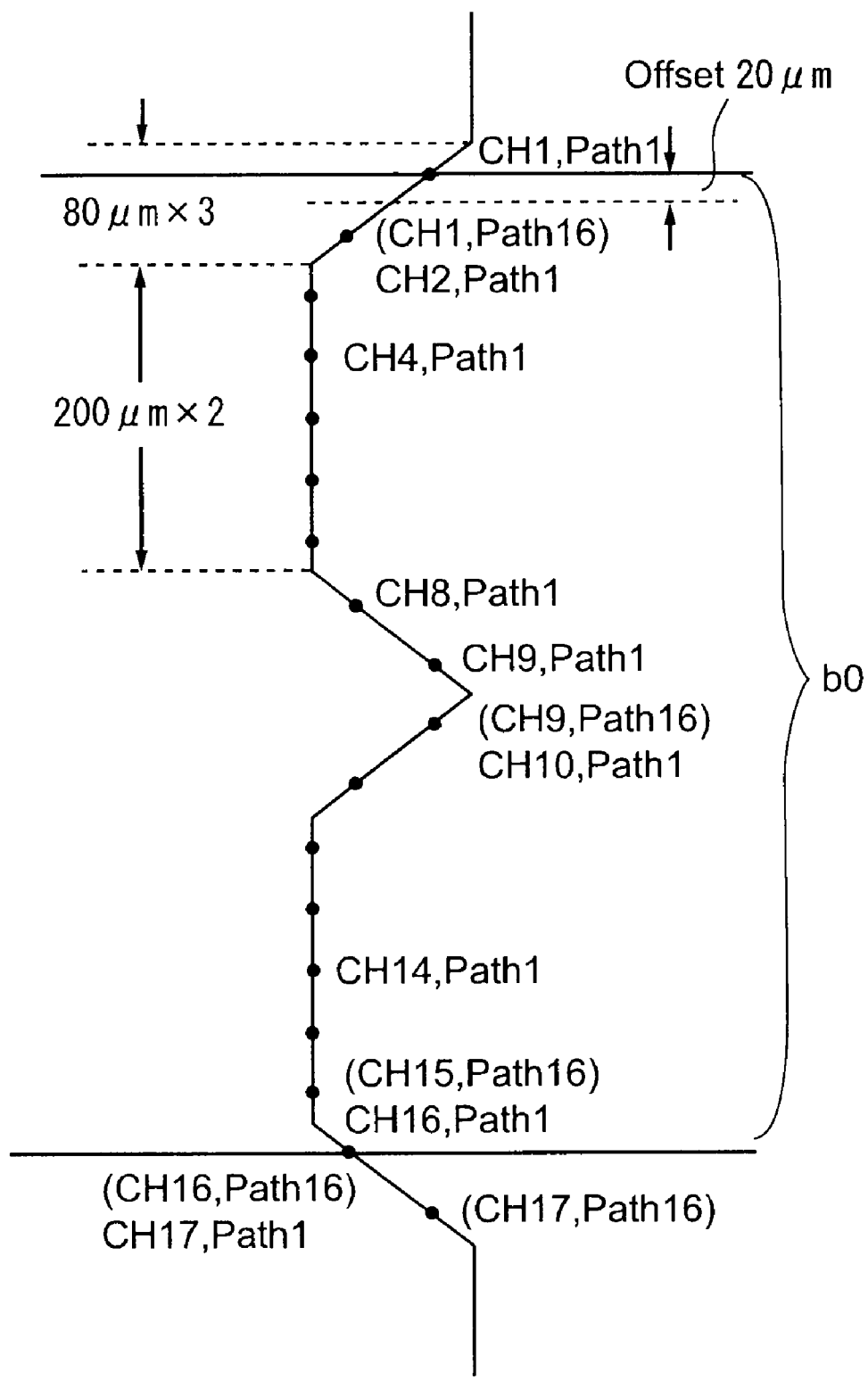
FIG. 10 is a diagram showing a positional relationship between the servo pattern and a data band and a relationship between a head channel position and a path according to one example.

FIG. 10 is a diagram showing a positional relationship between the servo pattern and the data band and a relationship between a head channel position and a path according to one example.

As shown in FIG. 10, settings are made as follows; the data band pitch as a pitch of the data band in the width direction is 640 μm, 16-track parallel recording/reproduction is realized, one data band requires 16 paths (8 reciprocations) (track pitch=2.5 μm), the LTM is ±15 μm or less, and the head has 17 channels (channel 17 (CH17): servo assisting channel) in consideration of the servo, though not limited thereto.

The frequency of inserting the servo pattern is of course higher the better in terms of sampling, but from the viewpoint of redundancy and in consideration of a sensitivity in detecting the positional information of the head, the magnetic tape width information, and the tilt information of the magnetic tape and the expected LTM, it is necessary to look for an optimal combination of the frequency and the servo pattern.

Hereinafter, descriptions will be given using the example shown in FIG. 7 in which the servo pattern is, up to this point, the most complex and a proprietary length thereof is short in the longitudinal direction (redundancy is lowered). However, the same holds true for other patterns as well.

In the servo pattern, the width of the segments having positive and negative azimuth angles is 80 μm, and the width of the segments having a 0-degree azimuth angle is 200 μm. It should be noted that although the servo pattern is usually constituted of a plurality of magnetization reversals, only one magnetization reversal is illustrated in this case. The position of the servo pattern and the data band in the tape width direction is offset by 18.75 (20 at upper end of track) μm in the case of Path 1. Normally, the tape runs from BOT to EOT in the case of an odd-number path and from EOT to BOT in the case of an even-number path. Each of the channels constitutes the data subband with a total of 16 paths (8 reciprocations). 8 paths of an odd number and 8 paths of an even number form different track groups so that the tracks of reciprocating paths are prevented from being brought adjacent to each other as much as possible. In this example, tracks of Path 16 and Path 1 of adjacent channels, tracks of Path 15 and Path 2, and tracks of Path 16 and Path 1 of adjacent channels correspond to this case. Identification information on the data band and the path may be inserted at a predetermined position of the data burst 3 in addition to the data. It should be noted that when a guard band is provided, the guard band is placed between those tracks (at which the tape running direction is opposite). (It should be noted that the guard band is usually a region separating the data bands or tracks. The guard band is not always necessary in terms of format.) The correspondences between the head channel of each path and the channels of FIG. 7 are as follows; A:CH10, B:CH8, C:CH17, D:CH1, E:CH14, and F:CH4. CH1 to CH16 are data channels, and CH17 is a servo assisting channel. Due to the offset, the value of d in Expression (13-7) is obtained as follows with N as a path number.

$d = dN + LTM$
$dN = -18.75 + \{2.5*(N-1)/2\}$
$N = 1, 3, 5, \ldots, 15$ (BOT→EOT)
$dN = \{2.5*(N-1)/2\}$
$N = 2, 4, 6, \ldots, 16$ (EOT→BOT)

Further, as track centers, YA and YB are as follows (unit: μm) (track center of CH9 as reference).
YA=−40
YB=+40
Similarly, YC, YD, YE, and YF are as follows (unit: μm).
YC=−320
YD=+320
YE=−200
YF=+200

Due to the offset, in any of the paths, the head does not get out of the segments with respect to an expected LTM of ±15 μm. Also, the direction of the servo pattern is reversed (with respect to magnetic tape direction) depending on whether N is odd/even and the combination of the data band numbers.

When the width of the data subband (head channel spacing) is already determined, for determining the azimuth angles and the interval and number of magnetization reversals, the following is taken into consideration; the LTM detection sensitivity, that is, to what μm-positional-change in the longitudinal direction the 1-μm LTM is to be converted (detection as time), for example, whether erroneous detection may be caused by the adjacent homopolar magnetization reversal due to the azimuth angle even at the time of a maximum LTM expected, and whether the sampling cycle and the redundancy determined based on the minimum number of magnetization reversals and the length of the data burst are sufficient (about 10 folds the necessary servo band (converted into frequency)). An increase in the azimuth angle for enhancing the LTM detection sensitivity contradicts other conditions. Thus, a compromise becomes necessary to be found.

As an example, the positive/negative azimuth angles are set to about ±14 degrees (tan α=0.25). As a result, X1 of FIG. 7 becomes 70 μm. Further, an interval between adjacent servo patterns is set to 1 mm. Therefore, when the magnetic tape velocity is 10 m/sec, the frequency in sampling the LTM is 10 KHz. Further, the 1-μm LTM is converted into a length of 0.5 μm in the longitudinal direction due to the positive/negative azimuth angles, which corresponds to a time of 50 nanoseconds (5E-8 sec) in the case of the magnetic tape velocity of 10 m/sec. If timed with a 1-GHz-clock counter, the LTM of about 0.1 μm can be detected (difference of about 5 counts), which is sufficient resolution performance with respect to the tracking pitch of 2.5 μm. For reference's sake, with the 5-count difference of the detection sensitivity of the tilt and deformation of the magnetic tape at this time (corresponding to change/deformation of about 5 nm in the longitudinal direction) as an indication, a tilt (angle γ) of about 7E-3 degrees and deformation (angle β) of about 8.5E-3 degrees are obtained. It should be noted that with the use of a proper analog circuit, it is also possible to measure the time with subnanosecond resolution performance while using a clock of a lower frequency.

When the servo patterns (transitions) have an interval of 10 μm and are each constituted of four transitions, and the guard spaces 4 placed before and after the servo pattern are each about 80 μm, the length of the data bursts 3 at this time is about 800 μm in total. In other words, use efficiency of the magnetic tape 1 in the longitudinal direction is about 80%.

It should be noted that by performing a position (phase) modulation like bringing the second transition closer to the first transition or distancing the third transition from the first transition (homopolar transition, modulation carried out such that the first and third transitions or second and fourth transitions are brought no closer than 20 µm from each other), the servo pattern constituted of four transitions can express 1-bit data and a unique pattern for frame synchronization (with modulation using multiple values, data of a plurality of bits can also be expressed). Specifically, in recording the servo pattern 2 across the full width of the magnetic tape 1 by a recording head 308 (servo pattern full-width recording head) having a recording gap 309 (see FIG. 17) to be described later that has the same shape as the boundary of the different magnetizations of the servo pattern 2, it becomes possible to form a different servo pattern by modulating the timing of the changes in the recording current and express binary data and a unique synchronization signal. Furthermore, using the plurality of servo patterns, a data frame constituted of the unique synchronization signal and a plurality of data bits can be obtained. It is also possible to obtain the binary data and the unique synchronization signal by forming, when forming the servo pattern 2c shown in FIG. 2C, a plurality of servo patterns by modulating the timing of changes in the recording current.

Based on the descriptions above, an example of a tracking servo mechanism of the magnetic tape apparatus will be described.

Figure 11:
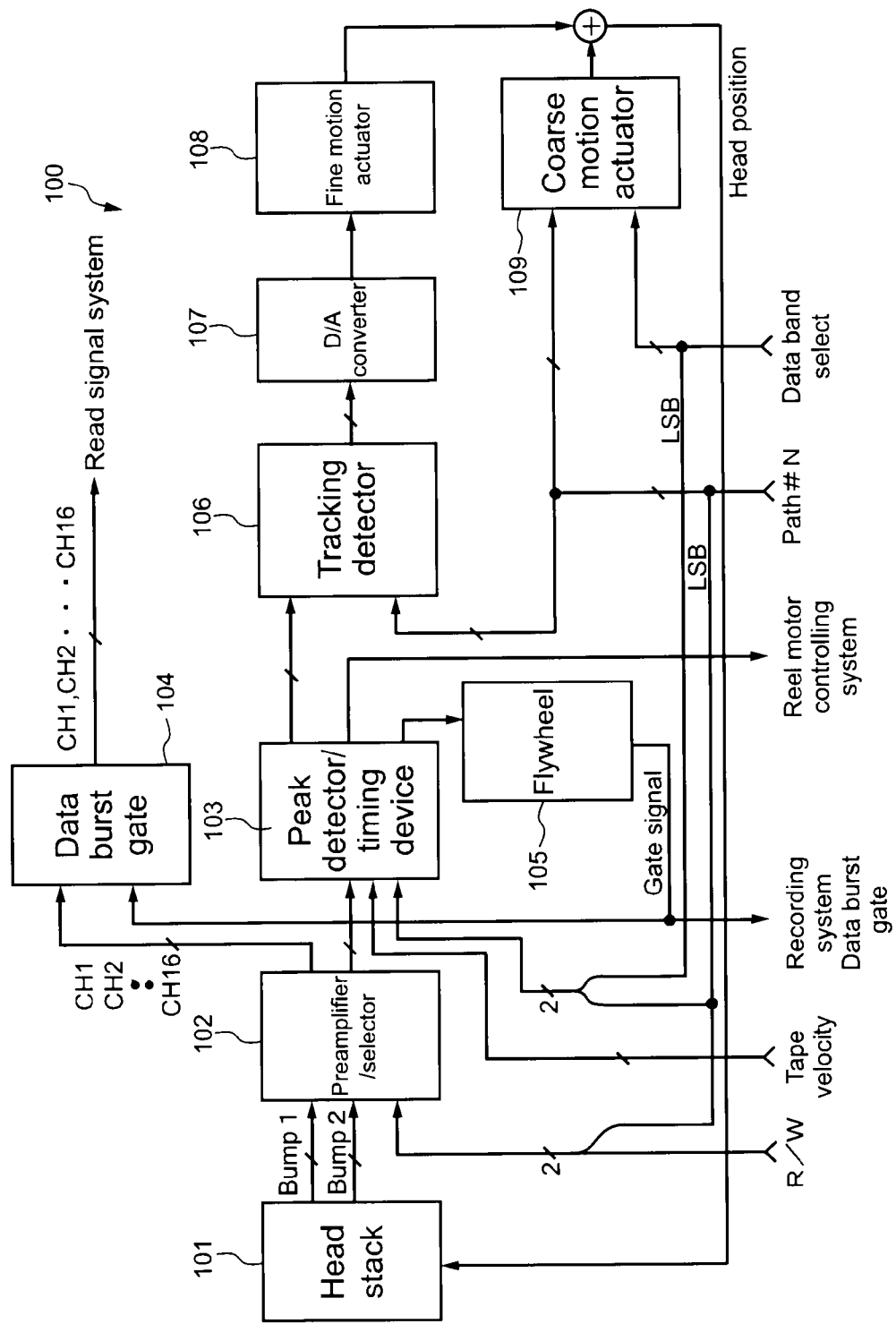
FIG. 11 is a block diagram showing a tracking servo mechanism of the magnetic tape apparatus.

FIG. 11 is a block diagram showing the tracking servo mechanism of the magnetic tape apparatus.

A known technique can be used for a signal processing system, a reel motor controlling system, and a servo pattern data demodulating system of the magnetic tape apparatus.

A tracking servo mechanism 100 includes a head stack 101, an AMP/SEL (preamplifier/selector) 102, a peak detector/timing (distance conversion) device 103, a data burst gate 104, a flywheel 105, a tracking (LTM) detector 106, a D/A (digital/analog) converter 107, a fine motion actuator 108, and a coarse motion actuator 109.

A SEL of the AMP/SEL (preamplifier/selector) 102 selects an output from the corresponding bump in accordance with R/W (read/write) and the tape running direction.

The peak detector/timing (distance conversion) device 103 carries out timing and peak detection of the channels corresponding to the channels A to F in accordance with information on a data band select LSB (tape running direction) and LSB of the path number N, and converts them into a distance in the longitudinal direction using the velocity information.

Upon receiving an output of the flywheel 105, the data burst gate 104 masks the servo pattern on a time axis, with respect to each data channel (CH1, CH2, . . . , CH16). It should be noted that although not shown, also on the recording side, for protecting the servo pattern, a functional block that gates the recording current upon receiving the output of the flywheel 105 is inserted.

The flywheel 105 is a known PLL (phase lock loop) having different time constants between a capture mode and a lock mode.

Upon receiving the output of the peak detector/timing (distance conversion) device 103, the tracking (LTM) detector 106 calculates the shift d and obtains a tracking error (LTM) using the information on the path number. A servo loop serves to bring the value closer to zero. Other outputs of the peak detector/timing (distance conversion) device 103 are used for control of the reel motor by detection of the magnetic tape velocity (conversion of pulse string cycle into velocity information), but since it is a well-known technique, reference will not be made here.

The fine motion actuator 108 and the coarse motion actuator 109 are, for example, a stage for driving the head H retained by a spring by a moving coil, and a pulse motor and a screw for driving a stage based on the information on the path number and data band designation information. It should be noted that the fine motion actuator 108 and the coarse motion actuator 109 can also be constituted of a linear motor having a long stroke. The fine motion actuator 108 and the coarse motion actuator 109 are well-known techniques.

Next, descriptions will be given on an example of a structure of the peak detector/timing (distance conversion) device 103 and the tracking (LTM) detector 106 according to the embodiment of the present invention (other blocks can be realized by a well-known technique).

Figure 12:
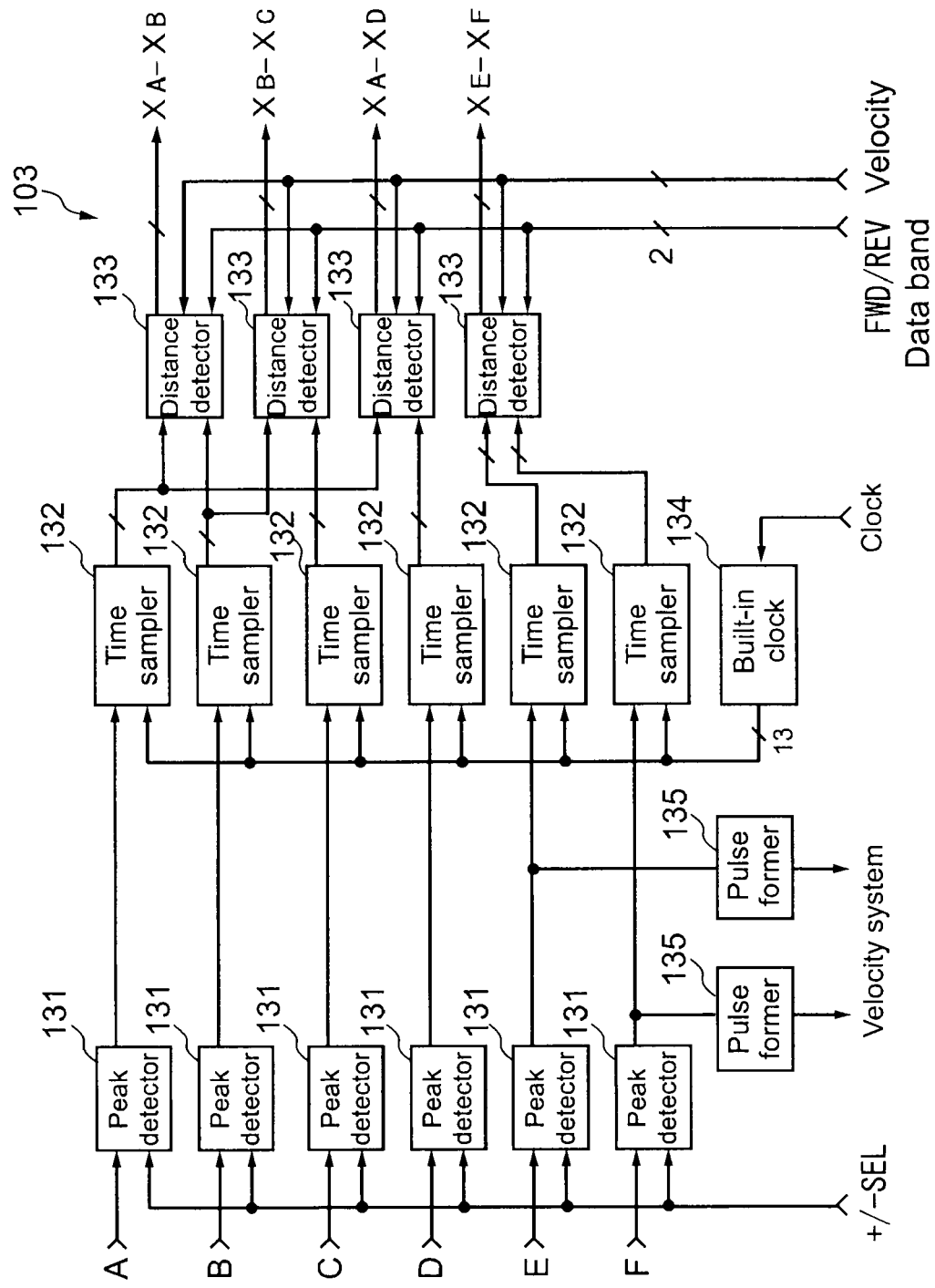
FIG. 12 is a block diagram specifically showing a peak detector/timing device of the tracking servo mechanism.

FIG. 12 is a block diagram specifically showing the peak detector/timing (distance conversion) device 103 of the tracking servo mechanism. Here, an example where a built-in clock is used for timing is shown.

The peak detector/timing (distance conversion) device 103 includes peak detectors 131, time samplers 132, distance detectors 133, a built-in clock 134, and pulse formers 135.

The peak detector 131 is constituted of a lowpass filter, a peak detector in the narrow sense (detects positive and negative peaks separately), and a selector, and selects and outputs any of the positive and negative detected peaks. The lowpass filter serves to attenuate the data burst and noise and prevent erroneous detection of the servo pattern.

The time sampler 132 obtains a time by sampling the output of the built-in clock 134 by the output of the peak detector 131.

The distance detector 133 obtains a difference between the outputs of the time samplers 132, converts it into a distance by multiplying the magnetic tape velocity, and inverts a sign thereof in accordance with the path number information (i.e., tape running direction information) and the data band information.

The built-in clock 134 is a counter and only needs to have a cycle longer than twice the time between the homopolar transitions of the servo pattern (requires bipolar representation corresponding to the order of two time values (i.e., two peaks)). In this example, a 13-bit counter with a clock of 1 GHz is adequate since the cycle of the output of the counter is a little more than 8 microseconds whereas an interval of 20 between the homopolar transitions corresponds to 2 microseconds in the case of the magnetic tape velocity of 10 m/sec.

An example of the pulse former 135 is a retrigger monostable multivibrator whose pulse width T is longer than the transition interval (in this example, interval of 2 microseconds, that is, 2<T<<100).

Figure 13:
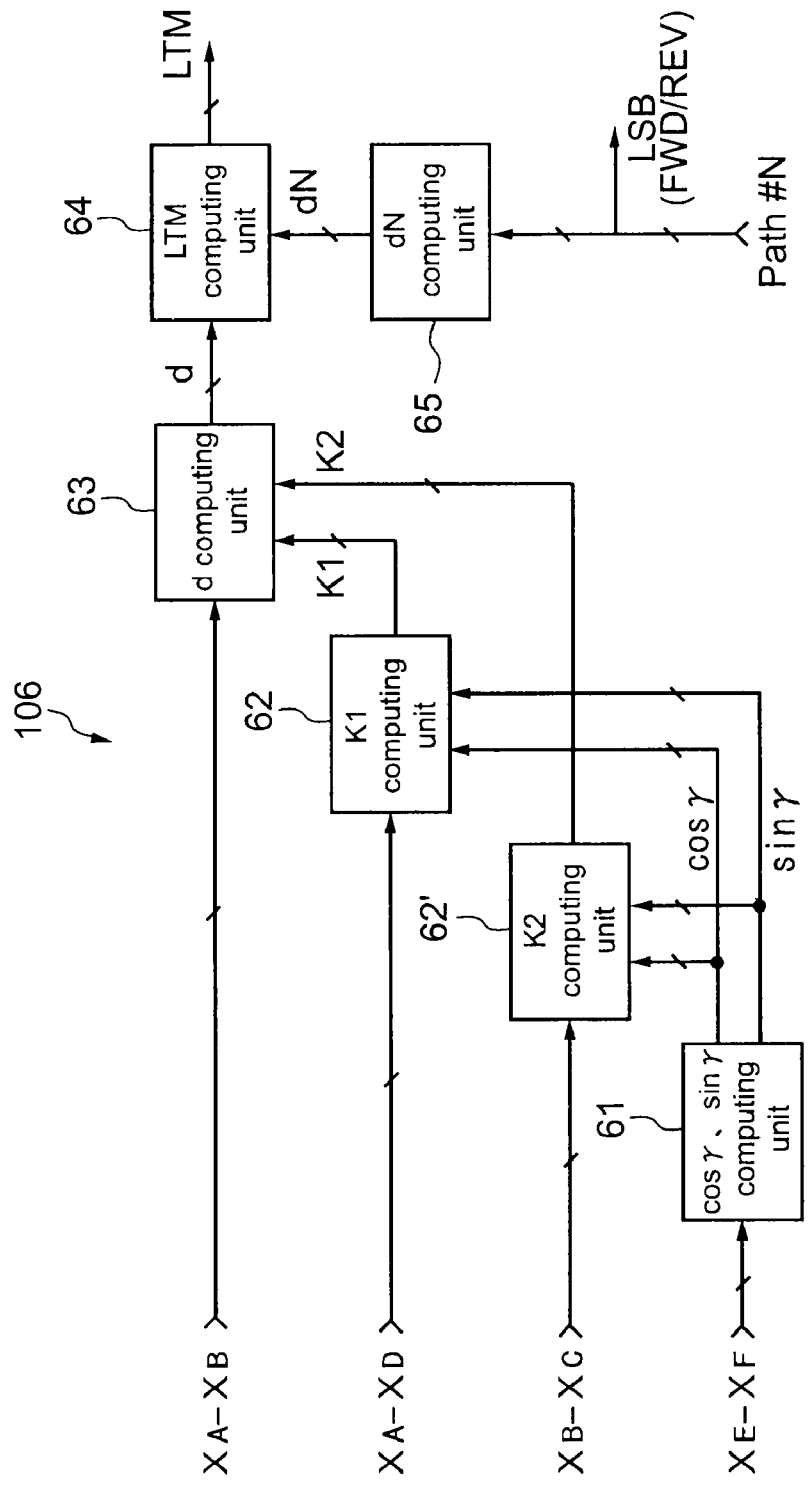
FIG. 13 is a block diagram specifically showing a tracking (LTM) detector of the tracking servo mechanism.

FIG. 13 is a block diagram specifically showing the tracking (LTM) detector 106 of the tracking servo mechanism.

The tracking (LTM) detector 106 includes a cosγ/sinγ computing unit 61, a K1 computing unit 62, a K2 computing unit 62', a d computing unit 63, an LTM computing unit 64, and a dN computing unit 65.

The cos γ/sin γ computing unit 61 first obtains γ (may be a linear approximate since the value of γ is small) from ±(XE−XF) from the distance detector 133 and the known YF and YE, and then obtains cos γ and sin γ (approximation up to a second term in a series expansion based on a relationship with other constants is adequate).

Upon receiving ±(XA−XD) and ±(XB−XC) from the distance detector 133 and cos γ and sin γ from the cos γ/sin γ computing unit 61, the K1 computing unit 62 and the K2 computing unit 62' calculate K1 and K2 using known Y0 (data band pitch), tan α (=0.25), X1 (=70), YA, YD, YB, and YC (arithmetic operations).

Upon receiving ±(XA−XB) from the distance detector 133 and K1 and K2 from the K1 computing unit 62 and the K2 computing unit 62', respectively, the d computing unit 63 calculates the shift d in accordance with Expression (13-7) together with the known YA and YB (arithmetic operations).

The LTM computing unit 64 obtains the LTM based on a difference between the output d of the d computing unit 63 and the output dN of the dN computing unit 65.

The dN computing unit 65 converts the path number N into dN (table lookup is simple). It should be noted that in this example, the LSB (least significant bit) of the path number N (N=1, 2, ..., 16) represents the tape running direction.

Figure 14:
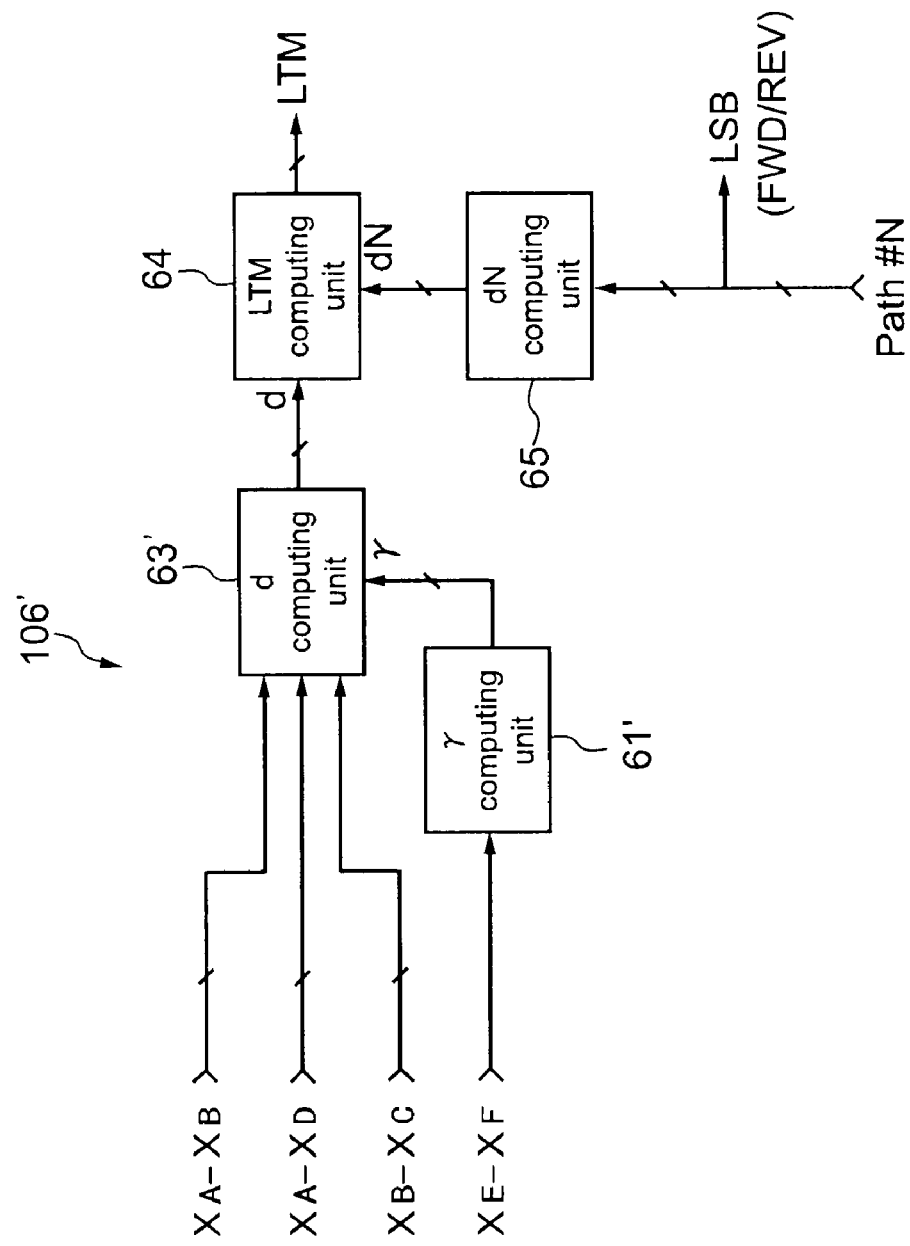
FIG. 14 is a block diagram specifically showing another tracking (LTM) detector.

FIG. 14 is a block diagram specifically showing another tracking (LTM) detector 106'.

In addition to the LTM computing unit 64 and the dN computing unit 65, the tracking (LTM) detector 106' includes a γ computing unit 61' and a d computing unit 63'.

The γ computing unit 61' calculates an approximate of γ (linear approximation).

Here, an example of calculating an approximation solution using the γ computing unit 61' and the d computing unit 63' will be described. The d computing unit 63' obtains d by carrying out an operation using Expression (22-1).

[Expression 12]

$$\gamma = \tan^{-1}\frac{X_E - X_F}{Y_F - Y_E}$$

$$\tan\gamma = \frac{X_E - X_F}{Y_F - Y_E}$$

Since γ~0 (0.05 radian at most)

$$\gamma \approx \frac{X_E - X_F}{Y_F - Y_E} \text{ (Linear approximation)}$$

$$\cos\gamma \approx 1 - \frac{\gamma^2}{2} \text{ (Up to second term in series expansion)}$$

$$\sin\gamma \approx \gamma - \frac{\gamma^3}{3} \text{ (Up to second term in series expansion)}$$

$$K_1 = \frac{-(X_A - X_D) - (Y_0\tan\alpha - X_1)\cos\gamma}{(Y_A - Y_D) + (Y_0\tan\alpha - X_1)\sin\gamma}$$

$$\approx \frac{-(X_A - X_D) - (Y_0\tan\alpha - X_1)\left(1 - \frac{\gamma^2}{2}\right)}{(Y_A - Y_D) + (Y_0\tan\alpha - X_1)\left(\gamma - \frac{\gamma^3}{3}\right)}$$

When numerical value of this example is substituted $$\approx \frac{-(X_A - X_D) - (640 \times 0.25 - 70)\left(1 - \frac{\gamma^2}{2}\right)}{-40 - 320 + (640 \times 0.25 - 70)\left(\gamma - \frac{\gamma^3}{3}\right)}$$

$$\therefore K_1 = \frac{(X_A - X_D) + 90\left(1 - \frac{\gamma^2}{2}\right)}{360 - 90\left(\gamma - \frac{\gamma^3}{3}\right)}$$

Similarly $$\therefore K_2 = \frac{(X_B - X_C) + 90\left(1 - \frac{\gamma^2}{2}\right)}{360 + 90\left(\gamma - \frac{\gamma^3}{3}\right)} \text{ provided that}$$

$$\gamma \approx \frac{X_E - X_F}{Y_F - Y_E} = \frac{X_E - X_F}{400}$$

[Expression 13]

$$d = \frac{K_1 Y_A + K_2 Y_B + (X_A - X_B)}{K_1 + K_2}$$

When numerical value of this example is substituted $$= \frac{-40K_1 + 40K_2 + (X_A - X_B)}{K_1 + K_2} = \frac{-40(K_1 - K_2) + (X_A - X_B)}{K_1 + K_2}$$

$$K_1 + K_2 \approx \frac{(X_A - X_D) + 90\left(1 - \frac{\gamma^2}{2}\right)}{360 - 90\left(\gamma - \frac{\gamma^3}{3}\right)} + \frac{(X_B - X_C) + 90\left(1 - \frac{\gamma^2}{2}\right)}{360 + 90\left(\gamma - \frac{\gamma^3}{3}\right)}$$

$$= \frac{90\left\{4 + \left(\gamma - \frac{\gamma^3}{3}\right)\right\}\left\{(X_A - X_D) + 90\left(1 - \frac{\gamma^2}{2}\right)\right\} +}{90 \times 90\left\{4 - \left(\gamma - \frac{\gamma^3}{3}\right)\right\}\left\{4 + \left(\gamma - \frac{\gamma^3}{3}\right)\right\}}$$
$$\phantom{=}\frac{90\left\{4 - \left(\gamma - \frac{\gamma^3}{3}\right)\right\}\left\{(X_B - X_C) + 90\left(1 - \frac{\gamma^2}{2}\right)\right\}}{}$$

$$= \frac{\left\{4 + \left(\gamma - \frac{\gamma^3}{3}\right)\right\}\left\{(X_A - X_D) + 90\left(1 - \frac{\gamma^2}{2}\right)\right\} +}{90\left\{16 - \left(\gamma - \frac{\gamma^3}{3}\right)^2\right\}}$$
$$\phantom{=}\frac{\left\{4 - \left(\gamma - \frac{\gamma^3}{3}\right)\right\}\left\{(X_B - X_C) + 90\left(1 - \frac{\gamma^2}{2}\right)\right\}}{}$$

$$= \frac{\left\{4 + \left(\gamma - \frac{\gamma^3}{3}\right)\right\}\left\{1 - \frac{\gamma^2}{2} + \frac{1}{90}(X_A - X_D)\right\} +}{16 - \left(\gamma - \frac{\gamma^3}{3}\right)^2}$$
$$\phantom{=}\frac{\left\{4 - \left(\gamma - \frac{\gamma^3}{3}\right)\right\}\left\{1 - \frac{\gamma^2}{2} + \frac{1}{90}(X_B - X_C)\right\}}{}$$

$$\approx \frac{(4 + \gamma)\left\{1 - \frac{\gamma^2}{2} + \frac{1}{90}(X_A - X_D)\right\} +}{16 - \gamma^2}$$
$$\phantom{\approx}\frac{(4 - \gamma)\left\{1 - \frac{\gamma^2}{2} + \frac{1}{90}(X_B - X_C)\right\}}{}$$

Similarly $$K_1 - K_2 \approx \frac{(4 + \gamma)\left\{1 - \frac{\gamma^2}{2} + \frac{1}{90}(X_A - X_D)\right\} -}{16 - \gamma^2}$$
$$\phantom{K_1 - K_2 \approx}\frac{(4 - \gamma)\left\{1 - \frac{\gamma^2}{2} + \frac{1}{90}(X_B - X_C)\right\}}{}$$

[Expression 14]

Numerator of $K_1 + K_2$ $$= (4 + \gamma) - (4 + \gamma)\frac{\gamma^2}{2} + \frac{1}{90}(4 + \gamma)(X_A - X_D) +$$
$$\phantom{=}(4 - \gamma) - (4 - \gamma)\frac{\gamma^2}{2} + \frac{1}{90}(4 - \gamma)(X_B - X_C)$$

$$= 8 - 4\gamma^2 + \frac{1}{90}(4 + \gamma)(X_A - X_D) + \frac{1}{90}(4 - \gamma)(X_B - X_C)$$

$$\therefore K_1 + K_2 \approx \frac{1}{16 - \gamma^2}$$

$$\left\{8\left(1 - \frac{\gamma^2}{2}\right) + \frac{1}{90}(4 + \gamma)(X_A - X_D) + \frac{1}{90}(4 - \gamma)(X_B - X_C)\right\}$$

-continued

Numerator of $K_1 - K_2$ $$= (4+\gamma) - (4+\gamma)\frac{\gamma^2}{2} + \frac{1}{90}(4+\gamma)(X_A - X_D) -$$

$$(4-\gamma) + (4-\gamma)\frac{\gamma^2}{2} - \frac{1}{90}(4-\gamma)(X_B - X_C)$$

$$= 2\gamma - \gamma^3 + \frac{1}{90}(4+\gamma)(X_A - X_D) - \frac{1}{90}(4-\gamma)(X_B - X_C)$$

$$\therefore K_1 - K_2 \approx \frac{1}{16-\gamma^2}$$

$$\left\{2\gamma\left(1-\frac{\gamma^2}{2}\right) + \frac{1}{90}(4+\gamma)(X_A - X_D) - \frac{1}{90}(4-\gamma)(X_B - X_C)\right\}$$

$$d \approx \frac{-40(K_1 - K_2) + (X_A - X_B)}{K_1 + K_2}$$

$$\approx \frac{40\left\{\begin{array}{c}2\gamma\left(1-\frac{\gamma^2}{2}\right) + \frac{1}{90}(4+\gamma)(X_A - X_D) - \\ \frac{1}{90}(4-\gamma)(X_B - X_C)\end{array}\right\} +}{8\left(1-\frac{\gamma^2}{2}\right) + \frac{1}{90}(4+\gamma)(X_A - X_D) + \frac{1}{90}(4-\gamma)(X_B - X_C)}$$

$$\approx \frac{(16-\gamma^2)(X_A - X_B) +}{\left\{\begin{array}{c}80\gamma\left(1-\frac{\gamma^2}{2}\right) + \frac{4}{9}(4+\gamma)(X_A - X_D) - \\ \frac{4}{9}(4-\gamma)(X_B - X_C)\end{array}\right\}}{8\left(1-\frac{\gamma^2}{2}\right) + \frac{1}{90}(4+\gamma)(X_A - X_D) + \frac{1}{90}(4-\gamma)(X_B - X_C)}$$

$$\therefore d = \frac{(16-\gamma^2)(X_A - X_B) + 80\gamma\left(1-\frac{\gamma^2}{2}\right) +}{\frac{4}{9}\{(4+\gamma)(X_A - X_D) - (4-\gamma)(X_B - X_C)\}}{8\left(1-\frac{\gamma^2}{2}\right) + \frac{1}{90}(4+\gamma)(X_A - X_D) + \frac{1}{90}(4-\gamma)(X_B - X_C)}$$

Provided that $\gamma \approx \frac{X_E - X_F}{400}$ (22-1)

In the case where the magnetic tape velocity is changed to, for example, 5 m/sec, the frequency becomes ½ and the time is doubled. In this case, it is desirable that a cutoff frequency of the lowpass filter also becomes ½. On the other hand, in timing, the count number is maintained while the clock frequency is cut to ½. Alternatively, a case where the count number is doubled while maintaining the clock frequency is also possible. Also in the case of other velocities, it goes without saying that the cutoff frequency of the lowpass filter and time measuring method only need to be changed in proportion to the velocity.

While referring to the example shown in FIG. 10, a method of recording a servo pattern will be described.

In converting the length of the magnetic tape into the time axis of a signal generator, the tape velocity is set to 10 m/sec. In the case of other velocities, the value of the time only needs to be in inverse proportion to the velocity (all double in the case of 5 m/sec).

Figure 15A:
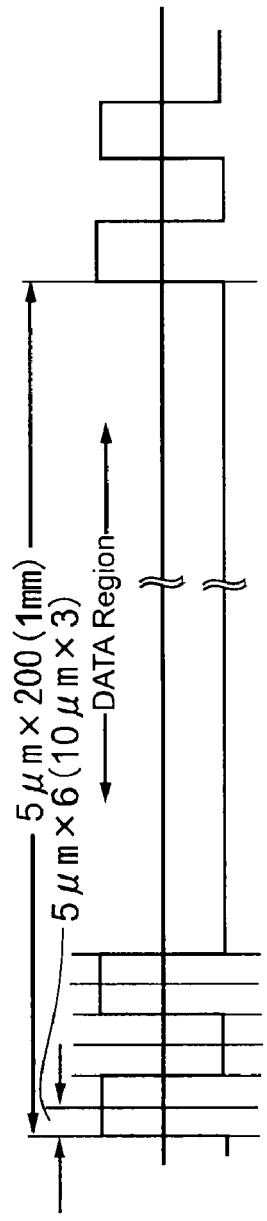
FIG. 15A shows a magnetization pattern on the magnetic tape.
Figure 15B:
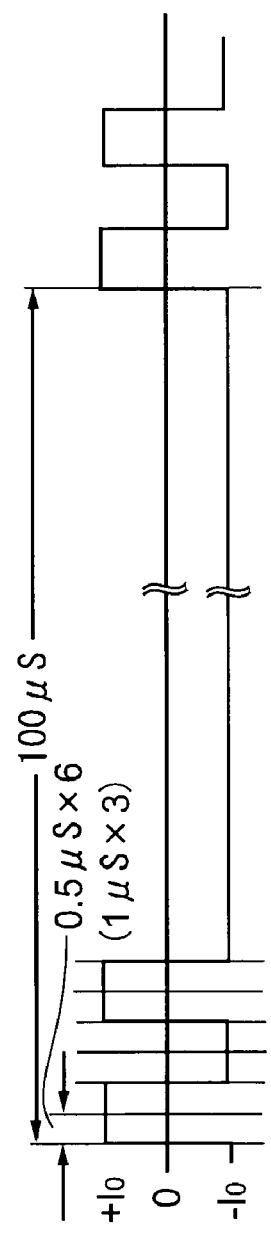
FIG. 15B shows a current waveform with which the magnetization pattern is recorded.
Figure 15C:
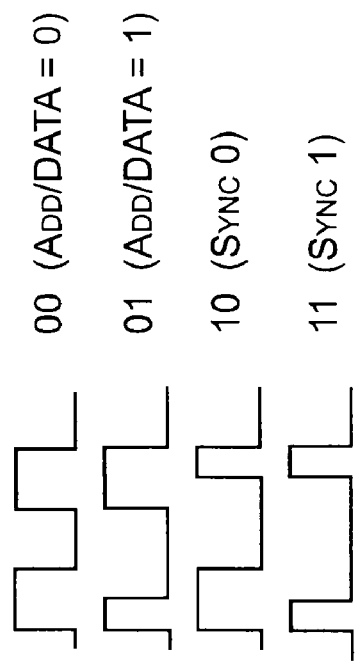
FIG. 15C shows an example where the servo pattern constituted of four transitions is modulated to express a 1-bit address or data, or a unique sync (synchronization) pattern 1 or 2.

FIG. 15A shows a magnetization pattern on the magnetic tape, FIG. 15B shows a current waveform with which the magnetization pattern is recorded, and FIG. 15C shows an example where the servo pattern constituted of four transitions is modulated to express a 1-bit address or data, or a unique sync (synchronization) pattern 1 or 2.

FIGS. 16A and 16B each show an image of the magnetic tape, the diagrams showing two extreme frame structures in a case of inserting, for example, a 20-bit address and 128-bit management data (128 bits may be "data+error control bits").

One frame is constituted of 128-bit data with respect to one address in FIG. 16A whereas in FIG. 16B, the sub-frame is constituted of 1-bit data with respect to one address, and one frame is constituted of 128 sub-frames.

In the former case, a length of one frame is shortened to 0.15 meters, but the unit of the address also becomes 0.15 meters.

Meanwhile, in the latter case, the length of one frame becomes a little more than 2.8 meters, but the unit of the address becomes 22 mm as a minimum value.

The latter case is more desirable in view of a property of the address and management data.

In either case, a sync pattern 0 is used for frame synchronization, and a sync pattern 1 is used as a separator of the sub-frames.

Hereinafter, the case of FIG. 16B regarding the method of realizing the recording apparatus will be described.

It should be noted that the 20-bit address satisfies the condition on address generation of modulo sufficiently longer than the maximum length of the tape captured by the servo pattern recording apparatus.

Specifically, assuming that the maximum tape length captured by the servo pattern recording apparatus is, for example, 5,000 m, when an address unit length is 22 mm, the following can be obtained.

(5000/0.022)=about 227273<262144=eighteenth power of 2

Thus, 18 bits is sufficient.

Further, when the address unit length is 0.15 m, 16 bits is sufficient.

Figure 17:
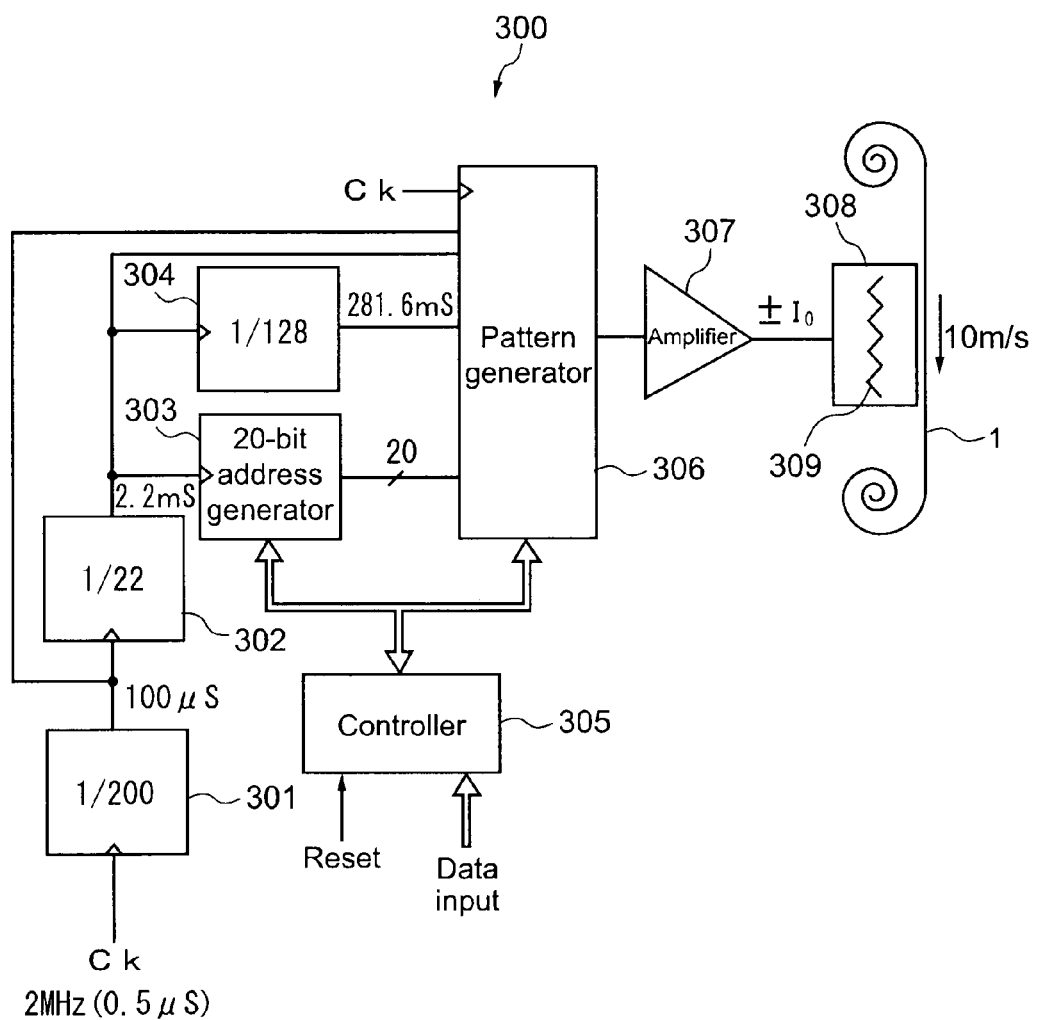
FIG. 17 is a diagram showing a structural example of an apparatus for recording the servo pattern having the frame structure shown in FIG. 16B.
Figure 18:
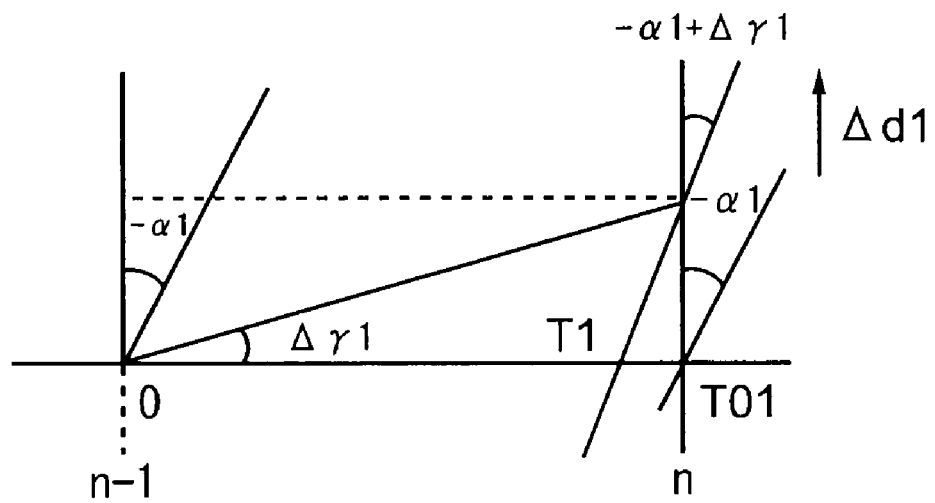
FIG. 18 shows diagrams for illustrating a principle in detecting a cycle of the magnetic tape (velocity information) including a servo pattern having both positive and negative azimuth angles.
Figure 18:
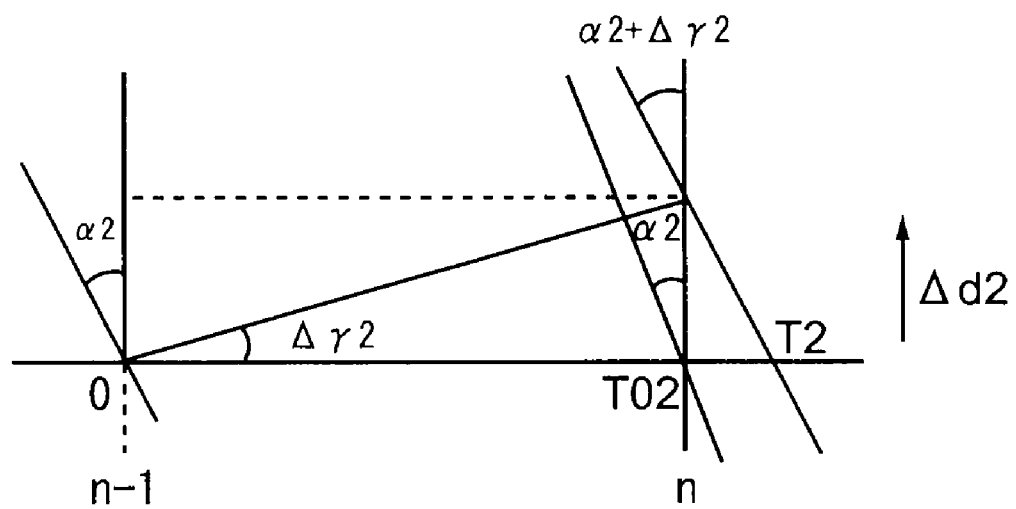
Figure 19:
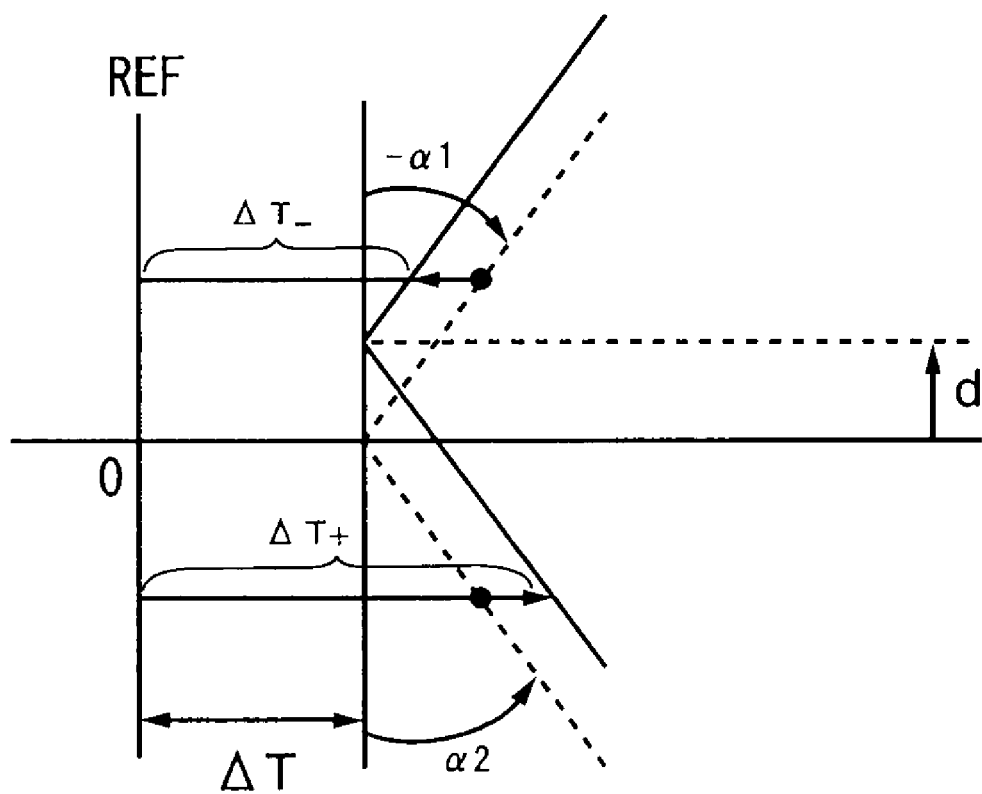
FIG. 19 is a diagram for illustrating a principle in phase-locking the magnetic tape including the servo pattern having both positive and negative azimuth angles.

FIG. 17 is a diagram showing a structural example of an apparatus for recording the servo pattern having the frame structure shown in FIG. 16B, the servo pattern recording apparatus being denoted by reference numeral 300.

A clock Ck of 2 MHz (cycle of 0.5 microseconds) is divided into ½₀₀ by a ½₀₀ divider 301 so that a servo pattern cycle (100 microseconds) is formed, and is then divided into 1/22 by a 1/22 divider 302 so that a sub-frame cycle (2.2 milliseconds) is formed. At the same time, a 20-bit address generator 303 is advanced a step.

Furthermore, division into 1/128 by a 1/128 divider 304 is carried out so that a frame cycle (281.6 milliseconds) is formed.

Via a controller 305, the 20-bit address generator 303 is reset every time a long magnetic tape 1 is loaded to the servo pattern recording apparatus 300.

Accordingly, the address within the long tape 1 is guaranteed to show a monotonic increase (therefore, the address of the tape partially cut and wound in the cartridge also shows a monotonic increase).

With the clock, the servo pattern cycle, the sub-frame cycle, the frame cycle, the 20-bit address data, and, in addition, 128-bit management data obtained via the controller 305 as an input, a pattern generator 306 outputs a signal in which the servo pattern shown in FIG. 15B is modulated to that shown in FIG. 15C.

The output of the pattern generator 306 is supplied to the recording head 308 via an amplifier 307. It should be noted that as an example, the method in which one servo pattern including four transitions expresses 1-bit data or a unique sync pattern, the address and the 1-bit data constitute a sub-frame, and the plurality of sub-frames constitute one frame has been described. However, also in other cases like a case where the number of transitions is large, a case of multi-value modulation, a case of constituting the sub-frame by the address and a plurality of data bits, and the like, realization is possible with the same speculation.

The recording head 308 is equipped with a ferrite ring and is a servo-pattern-full-width recording head capable of recording the servo pattern 2 across the full width of the magnetic tape 1. The recording head 308 includes the recording gap 309 having the same shape as the boundary of the different magnetizations of the servo pattern 2.

In recording the servo pattern across the full width of the magnetic tape 1 by the recording head 308, the controller 305 controls the number of changes of the recording current to be all odd or all even (for each servo pattern 2).

It is also possible that the servo pattern recording apparatus 300 includes a full-width erasing head (not shown). The full-width erasing head is used for erasing parts 2c' of the servo pattern 2c shown in FIG. 2C to thus form a data region.

In recording the servo pattern 2 across the full width of the magnetic tape 1 by the recording head 308, the timing of changes of the recording current can be modulated to express binary data or a unique synchronization signal.

In erasing the parts of the servo pattern 2 recorded in advance on the magnetic tape 1 by the recording head 308 to thus form a data recording region by the subsequent full-width erasing head, modulation of the recording current and an operation timing of the subsequent full-width erasing head can be controlled so that binary data or a unique synchronization signal is expressed within the servo pattern 2.

The servo pattern 2 can be made to correspond to the 1-bit data or the unique synchronization signal.

In the descriptions above, no guard band is provided at the boundary between the data bands and at the center and boundary of the data subbands. However, the present invention is of course effective even when providing the guard band in a structure in which tracks on both sides of those lines are recorded/reproduced in opposite magnetic tape running directions or in a case of a combination of parameters other than those described above (e.g., data band pitch, track pitch, and servo pattern).

It should be noted that only one data band b0 may be provided in the width direction of the magnetic tape 1. Further, a width of the guard band between the data bands b0 and b1 may be 0.

For example, in recording the servo pattern 2a shown in FIG. 2A across the full width of the magnetic tape 1 using the recording head 308 (servo-pattern-full-width recording head) having the recording gap 309 shown in FIG. 17 that has the same shape as the boundary of the different magnetizations of the servo pattern 2a, the number of changes of the recording current is set to be all odd or all even.

In the above embodiment, information on the deviation of the individual positions of the recording and/or reproducing gaps of the recording head H1 and the reproducing head H2 from the reference position is stored in the magnetic tape apparatus, and the stored information is used to correct the positional information of the recording head H1 and reproducing head H2, the deformation information of the magnetic tape 1, the tilt information of the magnetic tape 1, the magnetic tape velocity information, and/or the phase information of the magnetic tape 1.

The distance detector 133 obtains the difference between the outputs of the time samplers 132, but the lapse time or time difference between the outputs may be detected as a phase difference by a burst phase comparator.

When there is no segment having a 0-degree (recording) azimuth angle in the servo pattern 2 as in FIGS. 2A and 2B, an output servo pattern cycle of the reproducing channel corresponding to the segment having a positive azimuth angle and an output servo pattern cycle of the reproducing channel corresponding to the segment having a negative azimuth angle are measured and subjected to an operation that takes into account the absolute value of the azimuth angles, so that the resultant values are used as the velocity information.

Moreover, the segments having positive/negative azimuth angles in the servo pattern 2 are successively reproduced by the upstream reproducing head H2 and the downstream reproducing head H2 so that first and second velocity information are obtained from the lapse time or time difference between the outputs and the distance between the gaps of the upstream and downstream reproducing heads H2. After that, the first and second velocity information are subjected to an operation that takes into account the information on the tape tilt angle and the azimuth angles so as to be used as the velocity information.

The magnetic tape apparatus may include a controlling mechanism for controlling the tilt angle of the head H in accordance with the tilt information (angle γ) of the magnetic tape 1, for example. With this structure, the reproducing head can be positioned correctly on the track during read-after-write (read-while-write). Conversely, the reproducing head of the downstream bump can be used for positioning the recording head during recording.

In the case of phase-locking the magnetic tape 1 by a frequency de-multiplier (not shown) or the like, when the servo pattern 2 includes a segment having a 0-degree azimuth angle, a cycle (frequency) of the output servo pattern of the channel for reproducing the segment is demultiplexed by a frequency de-multiplier (not shown) as necessary to thus be phase-compared with a reference signal.

When the servo pattern 2 does not include the segment having a 0-degree azimuth angle in the case of phase-locking the magnetic tape 1, the cycle (frequency) of the output servo pattern of the reproducing channel corresponding to the segment having a positive azimuth angle is demultiplexed as necessary by a predetermined demultiplex ratio to be phase-compared with a first reference signal, and the cycle (frequency) of the output servo pattern of the reproducing channel corresponding to the segment having a negative azimuth angle is demultiplexed by the same demultiplex ratio to be phase-compared with a second reference signal. After that, outputs of phase comparators are subjected to an operation that takes into account the absolute value of the azimuth angles, thus locking the phase.

One or a plurality of data bursts 3 may be used for the tape mark. The tape mark (file mark) can represent the end of data.

It should be understood by those skilled in the art that various modifications, combinations, sub-combinations and alterations may occur depending on design requirements and other factors insofar as they are within the scope of the appended claims or the equivalents thereof.

What is claimed is:
1. A magnetic tape that includes a data band, comprising:
servo patterns formed along a longitudinal direction of the magnetic tape with an interval provided between each of the servo patterns, each of the servo patterns formed across a full width of the data band;
data recorded between the servo patterns; and
a guard space, adjacent to the servo patterns, between each of the servo patterns and the data, wherein each of the servo patterns is constituted of, on the data band, at least two segments adjoined in a width direction of the data band, and wherein the adjoined segments are recorded with different azimuth angles.

2. The magnetic tape according to claim 1, wherein the servo patterns are formed along the longitudinal direction of the magnetic tape at regular intervals.

3. The magnetic tape according to claim 1, wherein the guard space is a gap that separates the servo patterns and the data to absorb fluctuations of a position of the data in the longitudinal direction of the magnetic tape.

4. A magnetic tape apparatus, comprising:

a recording head to record data between servo patterns formed on a magnetic tape along a longitudinal direction of the magnetic tape with an interval provided between each of the servo patterns, each of the servo patterns formed across a full width of a data band of the magnetic tape, leaving a guard space, adjacent to the servo patterns, between the servo patterns and the recorded data; and a reproducing head to reproduce the data recorded on the magnetic tape, wherein at least two channels from among data channels of the reproducing head are used for reproducing the servo patterns, and wherein at least one of positioning information of one of the recording head and the reproducing head, deformation information of the magnetic tape, and tilt information of the magnetic tape is detected based on a correlation between reproduced servo signals from the data channels, on magnetic tape velocity information, and on channel information of the reproducing head.

5. The magnetic tape apparatus according to claim 4, further comprising:

an upstream bump and a downstream bump, wherein the reproducing head is piggybacked on the recording head on the upstream bump and the reproducing head is used to reproduce the servo patterns during recording of the magnetic tape.

6. The magnetic tape apparatus according to claim 4, further comprising:

an upstream bump and a downstream bump, wherein the reproducing head is placed on the downstream bump and the reproducing head is used to reproduce the servo patterns at a time of reproducing the data.

7. The magnetic tape apparatus according to claim 4, wherein identification information of at least one of the data band and a path is inserted at a predetermined position in a region for each path as a constituent element of a data region interposed between the servo patterns.

8. The magnetic tape apparatus according to claim 4, wherein a data region interposed between the servo patterns, one of the servo patterns adjacent to the data region, and a guard space attached thereto are considered as a unit for each path, and an integral multiple of the unit is handled as a physical block.

9. The magnetic tape apparatus according to claim 4, wherein a data region interposed between the servo patterns, one of the servo patterns adjacent to the data region, and a guard space attached thereto are considered as a unit for each path, and at least one unit is used as a tape mark.

10. The magnetic tape apparatus according to claim 4, wherein, when a segment having a 0-degree azimuth angle is absent within the servo pattern, a cycle of an output servo pattern of a reproducing channel corresponding to a segment having a positive azimuth angle and a cycle of an output servo pattern of a reproducing channel corresponding to a segment having a negative azimuth angle are measured, and an operation that takes into account an absolute value of the azimuth angles is carried out, to thus obtain velocity information.

11. The magnetic tape apparatus according to claim 4, wherein the magnetic tape apparatus stores information on a deviation of individual positions of at least one of a recording gap and a reproducing gap of the recording head and the reproducing head with respect to a reference position, and the stored information is used to correct at least one of the positioning information of the recording head and the reproducing head, the deformation information of the magnetic tape, the tilt information of the magnetic tape, the magnetic tape velocity information, and phase information of the magnetic tape.

12. The magnetic tape according to claim 4, wherein the guard space is a gap that separates the servo patterns and the data to absorb fluctuations of a position of the data in the longitudinal direction of the magnetic tape.

13. A magnetic tape apparatus, comprising:

a recording head to record data between servo patterns formed on a magnetic tape along a longitudinal direction of the magnetic tape with an interval provided between each of the servo patterns, each of the servo patterns formed across a full width of a data band of the magnetic tape, leaving a guard space, adjacent to the servo patterns, between the servo patterns and the recorded data; and a reproducing head to reproduce the data recorded on the magnetic tape, wherein at least two channels from among data channels and servo assisting channels of the reproducing head are used for reproducing the servo patterns, and wherein at least one of positioning information of one of the recording head and the reproducing head, deformation information of the magnetic tape, and tilt information of the magnetic tape is detected based on a correlation between reproduced servo signals from the channels, on magnetic tape velocity information, and on channel information of the reproducing head.

14. The magnetic tape apparatus according to claim 13, wherein, when a segment having a 0-degree azimuth angle is absent within the servo pattern, a cycle of an output servo pattern of a reproducing channel corresponding to a segment having a positive azimuth angle and a cycle of an output servo pattern of a reproducing channel corresponding to a segment having a negative azimuth angle are measured, and an operation that takes into account an absolute value of the azimuth angles is carried out, to thus obtain velocity information.

15. The magnetic tape apparatus according to claim 13, wherein the magnetic tape apparatus stores information on a deviation of individual positions of at least one of a recording gap and a reproducing gap of the recording head and the reproducing head with respect to a reference position, and the stored information is used to correct at least one of the positioning information of the recording head and the reproducing head, the deformation information of the magnetic tape, the tilt information of the magnetic tape, the magnetic tape velocity information, and phase information of the magnetic tape.

16. The magnetic tape apparatus according to claim 13,
wherein the reproducing head is piggybacked on the recording head and the recording head is placed upstream of the reproducing head, and
wherein the reproducing head is used to reproduce the servo patterns during recording of the magnetic tape.

17. The magnetic tape apparatus according to claim 13, wherein the reproducing head is downstream of the recording head and the reproducing head is used to reproduce the servo patterns at a time of reproducing the data.

18. The magnetic tape apparatus according to claim 13,
wherein identification information of at least one of the data band and a path is inserted at a predetermined position in a region for each path as a constituent element of a data region interposed between the servo patterns.

19. The magnetic tape apparatus according to claim 13,
wherein a data region interposed between the servo patterns, one of the servo patterns adjacent to the data region, and a guard space attached thereto are considered as a unit for each path, and an integral multiple of the unit is handled as a physical block.

20. The magnetic tape apparatus according to claim 13,
wherein a data region interposed between the servo patterns, one of the servo patterns adjacent to the data region, and a guard space attached thereto are considered as a unit for each path, and at least one unit is used as a tape mark.

21. The magnetic tape according to claim 13, wherein the guard space is a gap that separates the servo patterns and the data to absorb fluctuations of a position of the data in the longitudinal direction of the magnetic tape.

* * * * *